US012396455B2

(12) United States Patent
Fefer et al.

(10) Patent No.: US 12,396,455 B2
(45) Date of Patent: Aug. 26, 2025

(54) FORMULATIONS CONTAINING PARAFFINIC OIL AND ANTI-SETTLING AGENT

(71) Applicant: Nutrien AG Solutions (Canada) Inc., Calgary (CA)

(72) Inventors: Michael Fefer, Mississauga (CA); Jun Liu, Oakville (CA); Tomoki Ruo, Oakville (CA)

(73) Assignee: Nutrien AG Solutions (Canada) Inc., Calgary (CA)

( * ) Notice: Subject to any disclaimer, the term of this patent is extended or adjusted under 35 U.S.C. 154(b) by 0 days.

(21) Appl. No.: 17/065,085

(22) Filed: Oct. 7, 2020

(65) Prior Publication Data

US 2021/0068392 A1 Mar. 11, 2021

Related U.S. Application Data

(63) Continuation of application No. 14/405,644, filed as application No. PCT/CA2012/050444 on Jun. 29, 2012, now abandoned.

(60) Provisional application No. 61/655,417, filed on Jun. 4, 2012.

(51) Int. Cl.
| | |
|---|---|
| *A01N 27/00* | (2006.01) |
| *A01N 25/04* | (2006.01) |
| *A01N 25/08* | (2006.01) |
| *A01N 25/30* | (2006.01) |
| *A01N 43/653* | (2006.01) |
| *A01N 61/02* | (2006.01) |

(52) U.S. Cl.
CPC ............ *A01N 27/00* (2013.01); *A01N 25/04* (2013.01); *A01N 25/08* (2013.01); *A01N 25/30* (2013.01); *A01N 43/653* (2013.01); *A01N 61/02* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,714,062 | A | ‡ | 7/1955 | Koinig | C05C 9/00 71/1 |
| 2,786,821 | A | ‡ | 3/1957 | Gardner | C09D 5/00 524/55 |
| 2,870,037 | A | ‡ | 1/1959 | Converse | A01N 3/00 427/4 |
| 3,113,066 | A | ‡ | 12/1963 | Emond | A01N 63/00 424/93 |
| 3,131,119 | A | ‡ | 4/1964 | Fordyce | A01N 25/04 514/48 |
| 3,426,126 | A | ‡ | 2/1969 | Throne | A01N 61/02 514/76 |
| 3,615,799 | A | ‡ | 10/1971 | Gannon | E01C 7/36 106/27 |
| 3,689,574 | A | ‡ | 9/1972 | Engelhart | 568/83 |
| 3,799,758 | A | ‡ | 3/1974 | Franz | C07F 9/3813 504/20 |
| 3,877,921 | A | | 4/1975 | Timmons et al. | |
| 3,948,635 | A | ‡ | 4/1976 | Vachette | A01N 61/02 504/13 |
| 3,950,265 | A | ‡ | 4/1976 | Albrecht | A01N 25/04 516/77 |
| 3,997,322 | A | ‡ | 12/1976 | Ratledge | A01N 25/02 504/22 |
| 4,002,628 | A | ‡ | 1/1977 | Benefiel | C07D 213/30 544/33 |
| 4,015,970 | A | ‡ | 4/1977 | Hennart | A01N 25/12 71/11 |
| 4,018,970 | A | ‡ | 4/1977 | Jumel | H01M 4/08 429/16 |
| 4,041,164 | A | ‡ | 8/1977 | Albrecht | A01N 25/04 514/35 |
| 4,094,845 | A | ‡ | 6/1978 | De Long | A01N 3/00 524/51 |
| 4,124,720 | A | ‡ | 11/1978 | Wenmaekers | A61K 8/733 514/45 |
| 4,243,405 | A | ‡ | 1/1981 | Balasubramanyan | A01N 43/50 504/18 |
| 4,431,554 | A | ‡ | 2/1984 | Baur | C10M 159/06 508/25 |
| 4,584,013 | A | ‡ | 4/1986 | Brunner | C07D 295/185 504/22 |
| 4,618,360 | A | ‡ | 10/1986 | Brunner | A01N 37/44 504/22 |
| 4,693,745 | A | ‡ | 9/1987 | Brunner | A01N 37/42 504/22 |

(Continued)

FOREIGN PATENT DOCUMENTS

| | | | |
|---|---|---|---|
| AU | 2005253726 B2 | | 6/2011 |
| CA | 964482 | ‡ | 3/1975 |

(Continued)

OTHER PUBLICATIONS

Chembk (https://www.chembk.com/en/chem/C.I.%20Pigment%20Green%207) no pagination, no date.*
Cabot (Cab-O-Sil M-5, https://www.freemansupply.com/datasheets/cabosilm5.pdf, copyrighted 2008/2009, Cab-O-Sil M-5 available since at least 1998 as per EP0898957). no pagination, 2008 copyright.*
Derksen et al. (J Environ Hort. Mar. 2004 22(1):17-22).‡
Hsiang et al. (Acta Silv. Lign. Hung. Spec. Edition (2007) 71-74).‡
European Search Report in European Application No. 14763572. 6-1454, dated Feb. 16, 2017, 8 pages.‡

(Continued)

*Primary Examiner* — Erin E Hirt
(74) *Attorney, Agent, or Firm* — FAEGRE DRINKER BIDDLE & REATH

(57) ABSTRACT

This disclosure features combinations that include a paraffinic oil and one or more anti-settling agent.

18 Claims, 1 Drawing Sheet

(56) References Cited

U.S. PATENT DOCUMENTS

| | | | | |
|---|---|---|---|---|
| 4,698,334 A ‡ | 10/1987 | Horriere | A01N 59/20 | 514/14 |
| 4,734,432 A ‡ | 3/1988 | Szego | A01N 25/04 | 514/46 |
| 4,737,515 A ‡ | 4/1988 | Hallenbach | C07D 333/78 | 514/44 |
| 4,761,423 A ‡ | 8/1988 | Szego | A01C 1/06 | 47/57 |
| 4,826,863 A ‡ | 5/1989 | Szego | A01N 25/04 | 514/39 |
| 4,834,908 A ‡ | 5/1989 | Hazen | A01N 25/02 | 106/25 |
| 4,844,756 A ‡ | 7/1989 | Forsberg | C06B 47/145 | 149/109.6 |
| 4,853,026 A ‡ | 8/1989 | Frisch | A01N 25/04 | 504/12 |
| 4,902,333 A ‡ | 2/1990 | Quimby, Jr. | A01N 63/30 | 504/11 |
| 4,971,840 A ‡ | 11/1990 | Boho | B27K 3/20 | 427/39 |
| 5,002,962 A | 3/1991 | Pandey et al. | | |
| 5,084,087 A ‡ | 1/1992 | Hazen | A01N 25/02 | 504/23 |
| 5,102,442 A ‡ | 4/1992 | Hazen | A01N 25/02 | 504/11 |
| 5,106,872 A | 4/1992 | Alder et al. | | |
| 5,137,726 A ‡ | 8/1992 | Ogawa | A01N 25/04 | 424/40 |
| 5,178,795 A ‡ | 1/1993 | Roberts | A01N 25/30 | 504/36 |
| 5,185,151 A ‡ | 2/1993 | Young | A01N 59/02 | 424/40 |
| 5,206,021 A ‡ | 4/1993 | Dookhith | A01N 25/04 | 424/40 |
| 5,229,356 A ‡ | 7/1993 | Tocker | A01N 25/12 | 504/21 |
| 5,238,604 A ‡ | 8/1993 | Hazen | A01N 25/02 | 106/25 |
| 5,242,892 A | 9/1993 | Rebeiz | | |
| 5,300,526 A | 4/1994 | Rebeiz et al. | | |
| 5,308,827 A ‡ | 5/1994 | Sakamoto | A01N 25/06 | 504/20 |
| 5,330,995 A ‡ | 7/1994 | Eicken | A01N 37/22 | 514/35 |
| 5,336,661 A ‡ | 8/1994 | Lucas | A01N 57/12 | 504/12 |
| 5,352,729 A ‡ | 10/1994 | Birkhofer | C09B 67/0063 | 524/54 |
| 5,362,167 A ‡ | 11/1994 | Loftin | C09D 11/16 | 401/19 |
| 5,393,770 A ‡ | 2/1995 | Grayson | A01N 43/50 | 514/38 |
| 5,393,791 A ‡ | 2/1995 | Roberts | A01N 25/30 | 504/36 |
| 5,409,885 A ‡ | 4/1995 | Derian | A01N 25/04 | 504/25 |
| 5,504,054 A ‡ | 4/1996 | Murphy | A01N 25/30 | 504/20 |
| 5,547,918 A ‡ | 8/1996 | Newton | A01N 25/04 | 504/36 |
| 5,558,806 A ‡ | 9/1996 | Policello | A01N 25/30 | 516/20 |
| 5,580,567 A ‡ | 12/1996 | Roberts | B01F 17/0085 | 424/40 |
| 5,599,768 A ‡ | 2/1997 | Hermansky | A01N 25/04 | 504/21 |
| 5,599,804 A ‡ | 2/1997 | Mudge | A01N 43/90 | 514/14 |
| 5,614,203 A ‡ | 3/1997 | Dezur | A01N 25/04 | 424/40 |
| 5,643,852 A ‡ | 7/1997 | Lucas | A01N 57/12 | 504/12 |
| 5,658,851 A ‡ | 8/1997 | Murphy | A01N 61/02 | 504/36 |
| 5,665,672 A ‡ | 9/1997 | Lucas | A01N 57/12 | 504/12 |
| 5,668,086 A ‡ | 9/1997 | Tadayuki | A01N 43/40 | 504/23 |
| 5,703,016 A ‡ | 12/1997 | Magin | A01N 57/20 | 504/20 |
| 5,739,371 A ‡ | 4/1998 | O'Lenick, Jr. | C08G 77/388 | 556/41 |
| 5,741,502 A ‡ | 4/1998 | Roberts | A01N 25/30 | 424/40 |
| 5,913,884 A | 6/1999 | Trauner et al. | | |
| 5,919,858 A ‡ | 7/1999 | Loftin | C09D 11/16 | 106/31 |
| 5,958,104 A ‡ | 9/1999 | Nonomura | C05G 5/20 | 71/11 |
| 5,976,535 A | 11/1999 | Fritzberg et al. | | |
| 5,989,331 A ‡ | 11/1999 | Bauer | C09C 1/3692 | 106/44 |
| 6,015,897 A | 1/2000 | Theodore et al. | | |
| 6,033,647 A ‡ | 3/2000 | Touzan | A61K 8/046 | 424/45 |
| 6,036,941 A | 3/2000 | Bottiroli et al. | | |
| 6,117,820 A ‡ | 9/2000 | Cutler | A01N 25/30 | 504/20 |
| 6,123,923 A | 9/2000 | Unger et al. | | |
| 6,146,652 A ‡ | 11/2000 | Gore | A01N 25/22 | 424/40 |
| 6,159,900 A ‡ | 12/2000 | Bieringer | A01N 25/30 | 504/20 |
| 6,162,763 A ‡ | 12/2000 | Tateno | A01N 63/00 | 435/25 |
| 6,210,656 B1 ‡ | 4/2001 | Touzan | A61K 8/046 | 424/45 |
| 6,217,869 B1 | 4/2001 | Meyer et al. | | |
| 6,221,811 B1 ‡ | 4/2001 | Policello | A01N 25/30 | 424/40 |
| 6,329,321 B2 ‡ | 12/2001 | Okura | A01N 25/24 | 106/45 |
| 6,403,061 B1 ‡ | 6/2002 | Candau | A61K 8/42 | 424/59 |
| 6,416,748 B1 ‡ | 7/2002 | Candau | A61Q 5/02 | 424/59 |
| 6,432,877 B2 ‡ | 8/2002 | Okura | A01N 59/16 | 106/45 |
| 6,498,945 B1 | 12/2002 | Alfheim et al. | | |
| 6,515,031 B2 ‡ | 2/2003 | Fefer | A01N 25/30 | 516/73 |
| 6,573,258 B2 | 6/2003 | Bommer et al. | | |
| 6,673,360 B2 ‡ | 1/2004 | Fefer | A01N 25/30 | 424/40 |
| 6,683,030 B2 ‡ | 1/2004 | Kober | A01N 25/02 | 504/31 |
| 6,713,518 B1 ‡ | 3/2004 | Bessette | A01N 25/08 | 514/73 |
| 6,727,205 B2 ‡ | 4/2004 | Brinkman | A01N 37/42 | 504/24 |
| 6,734,202 B2 ‡ | 5/2004 | Cotter | A01N 35/04 | 514/38 |
| 6,803,345 B2 ‡ | 10/2004 | Herold | A01N 25/02 | 504/25 |
| 6,878,674 B2 ‡ | 4/2005 | Kobayashi | A01N 39/02 | 504/13 |
| 6,972,273 B2 ‡ | 12/2005 | Sedun | A01N 37/32 | 504/11 |
| 7,135,435 B2 ‡ | 11/2006 | Cooper | A01N 37/42 | 504/13 |
| 7,166,725 B2 ‡ | 1/2007 | Fang et al. | A61P 25/04 | 548/24 |
| 7,384,927 B2 | 6/2008 | Iori | | |
| 7,799,343 B2 ‡ | 9/2010 | Loughner | A01N 61/00 | 424/48 |
| 7,923,452 B2 ‡ | 4/2011 | Birner | A01N 43/54 | 514/27 |

(56) References Cited

U.S. PATENT DOCUMENTS

| | | | |
|---|---|---|---|
| RE42,394 E ‡ | 5/2011 | Mudge | A01N 59/26 514/14 |
| 8,076,267 B2 ‡ | 12/2011 | Diebold | A01N 37/32 504/11 |
| 8,153,558 B2 ‡ | 4/2012 | Norton | A01N 57/12 504/19 |
| 8,298,990 B2 ‡ | 10/2012 | Wu | A01N 25/08 504/11 |
| 8,426,343 B2 ‡ | 4/2013 | Norton | A01N 57/12 504/19 |
| 8,449,917 B2 | 5/2013 | Dave et al. | |
| 8,569,210 B2 * | 10/2013 | Fefer | A01N 47/40 504/191 |
| 8,633,311 B2 | 1/2014 | Bommer et al. | |
| 8,747,874 B2 ‡ | 6/2014 | Fefer | A01N 61/02 424/406 |
| 8,748,342 B2 ‡ | 6/2014 | Gewehr | A01N 37/10 504/10 |
| 8,853,128 B2 * | 10/2014 | Fefer | A61P 3/00 504/191 |
| 9,044,008 B2 ‡ | 6/2015 | Fefer | A01N 61/02 |
| 9,225,504 B2 | 12/2015 | Wu | |
| 9,226,504 B2 * | 1/2016 | Fefer | A01N 27/00 |
| 9,357,768 B2 ‡ | 6/2016 | Fefer | A01N 25/04 |
| 9,451,773 B2 * | 9/2016 | Fefer | A01N 55/00 |
| 9,485,988 B2 * | 11/2016 | Fefer | A61P 3/00 |
| 9,750,249 B2 ‡ | 9/2017 | Fefer | A01N 43/40 |
| 9,826,738 B2 * | 11/2017 | Fefer | A01N 25/04 |
| 9,999,219 B2 ‡ | 6/2018 | Fefer | A01N 61/02 |
| 2001/0008873 A1 ‡ | 7/2001 | Shafer | A01N 43/70 504/13 |
| 2001/0019728 A1 ‡ | 9/2001 | Basinger | A01N 59/12 424/66 |
| 2001/0044381 A1 ‡ | 11/2001 | Dean | A01N 37/44 504/13 |
| 2002/0098161 A1 | 7/2002 | Uhrich | |
| 2002/0137901 A1 | 9/2002 | Cavanaugh | |
| 2002/0161057 A1 ‡ | 10/2002 | Fefer | B01F 17/0092 516/98 |
| 2002/0183245 A1 | 12/2002 | Hasan et al. | |
| 2003/0050296 A1 | 3/2003 | Boomer et al. | |
| 2003/0087764 A1 ‡ | 5/2003 | Pallas | A01N 57/20 504/36 |
| 2003/0185754 A1 ‡ | 10/2003 | Cohen et al. | G01N 33/5088 424/9 |
| 2003/0187079 A1 ‡ | 10/2003 | Fefer | A01N 25/30 516/73 |
| 2003/0194454 A1 ‡ | 10/2003 | Bessette | A01N 65/22 424/74 |
| 2003/0198659 A1 ‡ | 10/2003 | Hoffmann | D04H 3/16 424/41 |
| 2003/0198696 A1 ‡ | 10/2003 | Keen | A61K 36/899 424/72 |
| 2004/0132621 A1 ‡ | 7/2004 | Frisch | A01N 47/20 504/36 |
| 2004/0132622 A1 ‡ | 7/2004 | Stewart | A01N 37/40 504/36 |
| 2004/0151749 A1 ‡ | 8/2004 | Hasebe | A01N 37/36 424/40 |
| 2004/0162239 A1 | 8/2004 | Allan et al. | |
| 2004/0167034 A1 ‡ | 8/2004 | Coote | A61P 3/02 504/35 |
| 2004/0192556 A1 ‡ | 9/2004 | Schregenberger | A01N 25/30 504/36 |
| 2004/0237133 A1 ‡ | 11/2004 | Goldman | C12N 15/8205 800/27 |
| 2004/0266748 A1 | 12/2004 | Robinson et al. | |
| 2005/0020559 A1 | 1/2005 | Robinson et al. | |
| 2005/0026786 A1 ‡ | 2/2005 | Deckwer | A01N 43/40 504/21 |
| 2005/0074414 A1 | 4/2005 | Tamarkin et al. | |
| 2005/0181949 A1 ‡ | 8/2005 | Norton | A01N 43/90 504/28 |
| 2005/0202102 A1 ‡ | 9/2005 | Miller | A01N 25/04 424/68 |
| 2005/0233907 A1 ‡ | 10/2005 | Nabors | A01N 37/22 504/14 |
| 2005/0244357 A1 ‡ | 11/2005 | Sieverding | A01N 25/04 424/70 |
| 2005/0261379 A1 ‡ | 11/2005 | Fefer | A01N 25/04 514/76 |
| 2005/0274164 A1 ‡ | 12/2005 | Coates | C05C 9/00 71/31 |
| 2006/0063676 A1 ‡ | 3/2006 | Brigance | A01N 25/04 504/11 |
| 2006/0068991 A1 ‡ | 3/2006 | Norton | A01N 43/90 504/28 |
| 2006/0105974 A1 | 5/2006 | Lange et al. | |
| 2006/0194699 A1 ‡ | 8/2006 | Moucharafieh | A01N 57/20 504/20 |
| 2006/0276339 A1 ‡ | 12/2006 | Windsor | A01N 37/38 504/12 |
| 2006/0282961 A1 ‡ | 12/2006 | Hughes | C09B 67/0073 8/550 |
| 2006/0293188 A1 ‡ | 12/2006 | Norton | A01N 47/38 504/28 |
| 2007/0148200 A1 ‡ | 6/2007 | Stringfellow | A01N 25/30 424/40 |
| 2007/0184005 A1 ‡ | 8/2007 | Policello | A61K 8/894 424/70 |
| 2007/0197386 A1 ‡ | 8/2007 | Diebold | A01N 39/04 504/13 |
| 2007/0197387 A1 ‡ | 8/2007 | Polge | A01N 37/22 504/14 |
| 2007/0213500 A1 | 9/2007 | Uhrich | |
| 2007/0281878 A1 * | 12/2007 | Gottschalk-Gaudig | A61K 9/1075 516/54 |
| 2007/0287720 A1 ‡ | 12/2007 | Royalty | A01N 43/08 514/26 |
| 2008/0064601 A1 ‡ | 3/2008 | Casanello | A01N 43/653 504/27 |
| 2008/0085832 A1 ‡ | 4/2008 | Fefer | A01N 25/04 504/14 |
| 2008/0112909 A1 ‡ | 5/2008 | Faler | A61Q 17/04 424/61 |
| 2008/0153702 A1 ‡ | 6/2008 | Voeste | A01N 37/46 504/10 |
| 2008/0161367 A1 ‡ | 7/2008 | Voeste | A01N 51/00 514/36 |
| 2008/0193431 A1 | 8/2008 | Zheng et al. | |
| 2008/0194704 A1 ‡ | 8/2008 | Bhatnagar | A01N 27/00 514/76 |
| 2008/0274888 A1 ‡ | 11/2008 | Goldstein | A01N 37/46 504/14 |
| 2008/0280763 A1 ‡ | 11/2008 | Hodge | A01N 57/12 504/12 |
| 2008/0281091 A1 | 11/2008 | Brundish et al. | |
| 2008/0293567 A1 ‡ | 11/2008 | Birner | A01N 43/54 504/10 |
| 2009/0092986 A1 ‡ | 4/2009 | Taing | C07H 19/16 435/6 |
| 2009/0175873 A1 | 7/2009 | Liu | |
| 2009/0215851 A1 | 8/2009 | Van Der Haas et al. | |
| 2009/0220430 A1 | 9/2009 | Rajopadhye et al. | |
| 2009/0325922 A1 ‡ | 12/2009 | Fefer | A01N 55/02 514/18 |
| 2010/0009970 A1 | 1/2010 | Johansen et al. | |
| 2010/0016447 A1 ‡ | 1/2010 | Fefer | A01N 61/02 514/76 |
| 2010/0099567 A1 ‡ | 4/2010 | Shinichi | A01N 57/20 504/20 |
| 2010/0218282 A1 | 8/2010 | Nguyen et al. | |
| 2010/0228343 A1 | 9/2010 | Brandom et al. | |
| 2010/0251416 A1 | 9/2010 | Puzio et al. | |
| 2010/0266716 A1 | 10/2010 | Olson et al. | |

(56) References Cited

U.S. PATENT DOCUMENTS

| | | | |
|---|---|---|---|
| 2010/0292202 A1‡ | 11/2010 | Vandenberg | A01N 37/50 514/18 |
| 2010/0310617 A1‡ | 12/2010 | Zhang | A61K 8/064 424/40 |
| 2010/0317527 A1‡ | 12/2010 | Takeuchi | A01N 37/44 504/27 |
| 2010/0323897 A1 | 12/2010 | Burke | |
| 2011/0269628 A1 | 11/2011 | Gewehr et al. | |
| 2011/0275516 A1‡ | 11/2011 | Wu | A01N 25/10 504/10 |
| 2011/0306495 A1‡ | 12/2011 | Samarajeewa | A01N 25/30 504/12 |
| 2012/0070377 A1 | 3/2012 | Yahioglu et al. | |
| 2012/0108431 A1‡ | 5/2012 | Williams | A01N 37/44 504/19 |
| 2012/0149572 A1 | 6/2012 | Gewehr et al. | |
| 2012/0197179 A1 | 8/2012 | Khan et al. | |
| 2012/0245232 A1‡ | 9/2012 | Bousque | A01N 61/02 514/76 |
| 2013/0172185 A1 | 7/2013 | Wei | |
| 2013/0224874 A1 | 8/2013 | Vinogradov et al. | |
| 2013/0231604 A1 | 9/2013 | Jones et al. | |
| 2013/0253016 A1‡ | 9/2013 | Fefer | A01N 27/00 514/35 |
| 2013/0296370 A1 | 11/2013 | Di Martino et al. | |
| 2013/0303371 A1‡ | 11/2013 | Wright | A01N 57/20 504/12 |
| 2013/0303374 A1‡ | 11/2013 | Fefer | A01N 39/02 504/14 |
| 2013/0324620 A1‡ | 12/2013 | Fefer | A01N 25/04 514/76 |
| 2014/0066449 A1 | 3/2014 | Stewart | |
| 2014/0107070 A1‡ | 4/2014 | Fefer | A01N 27/00 514/63 |
| 2014/0228218 A1‡ | 8/2014 | Fefer | A01N 43/54 504/18 |
| 2014/0256556 A1‡ | 9/2014 | Fefer | A01N 47/24 504/35 |
| 2015/0065475 A1‡ | 3/2015 | Fefer | A01N 55/02 514/18 |
| 2015/0225723 A1 | 8/2015 | Na et al. | |
| 2015/0237869 A1‡ | 8/2015 | Fefer | A01N 61/02 514/76 |
| 2015/0296801 A1 | 10/2015 | Brahm et al. | |
| 2015/0305329 A1 | 10/2015 | Fefer et al. | |
| 2016/0073634 A1 | 3/2016 | Hasan et al. | |
| 2016/0150783 A1‡ | 6/2016 | Fefer | A01N 43/40 514/35 |
| 2016/0177028 A1 | 6/2016 | Bolikal et al. | |
| 2016/0198723 A1‡ | 7/2016 | Fefer | A01N 61/02 514/76 |
| 2016/0205925 A1 | 7/2016 | Nisnevitch et al. | |
| 2016/0243172 A1 | 8/2016 | Cook et al. | |
| 2016/0286801 A1‡ | 10/2016 | Liu | A01N 43/38 |
| 2017/0037427 A1 | 2/2017 | Evdokimov et al. | |
| 2017/0071201 A1‡ | 3/2017 | Fefer | A01N 25/30 |
| 2017/0119908 A1 | 5/2017 | Rajopadhye et al. | |
| 2017/0119913 A1 | 5/2017 | Osterkamp et al. | |
| 2017/0223951 A1‡ | 8/2017 | Fefer | A01N 27/00 |
| 2017/0295793 A1 | 10/2017 | Chang et al. | |
| 2018/0092353 A1‡ | 4/2018 | Fefer | A01N 39/02 |
| 2019/0111168 A1 | 4/2019 | Baumler et al. | |
| 2020/0253211 A1 | 8/2020 | Fefer et al. | |
| 2021/0352889 A1 | 11/2021 | Fefer | |
| 2022/0046920 A1 | 2/2022 | Liu et al. | |
| 2022/0089615 A1 | 3/2022 | Fefer et al. | |
| 2022/0132855 A1 | 5/2022 | Fefer et al. | |
| 2022/0132856 A1 | 5/2022 | Fefer et al. | |

FOREIGN PATENT DOCUMENTS

| | | | | |
|---|---|---|---|---|
| CA | 1179350 A | | 12/1984 | |
| CA | 1338855 | | 1/1997 | |
| CA | 2333175 | | 12/1999 | |
| CA | 2434848 | ‡ | 8/2002 | |
| CA | 2459928 | | 4/2003 | |
| CA | 2069311 | ‡ | 5/2005 | |
| CA | 2507482 | ‡ | 5/2005 | |
| CA | 2496142 | ‡ | 8/2005 | |
| CA | 2472806 | ‡ | 11/2005 | |
| CA | 2568817 A1 | | 12/2005 | |
| CA | 2209920 | ‡ | 1/2007 | |
| CA | 2634630 | | 7/2007 | |
| CA | 2562718 | ‡ | 4/2008 | |
| CA | 2605092 | ‡ | 4/2008 | |
| CA | 2625415 | ‡ | 9/2008 | |
| CA | 2701764 | | 4/2009 | |
| CA | 2702811 | | 4/2009 | |
| CA | 2711660 | ‡ | 7/2009 | |
| CA | 2748084 | ‡ | 7/2010 | |
| CA | 2839775 A1 | ‡ | 6/2013 | C05F 11/02 |
| CA | 3019623 | | 10/2017 | |
| CN | 1250471 | | 4/2000 | |
| CN | 1558760 | | 12/2004 | |
| CN | 101238820 | ‡ | 8/2008 | |
| CN | 101304658 | ‡ | 11/2008 | |
| CN | 101390517 | ‡ | 3/2009 | |
| CN | 101415327 A | | 4/2009 | |
| CN | 101473849 | ‡ | 7/2009 | |
| CN | 101998827 | ‡ | 3/2011 | |
| CN | 102273467 | | 6/2011 | |
| CN | 102245027 | | 11/2011 | |
| CN | 102701836 A | | 10/2012 | |
| CN | 101773113 | ‡ | 2/2013 | |
| CN | 102285992 | | 12/2013 | |
| CN | 104513250 | | 4/2015 | |
| CN | 105111219 | | 12/2015 | |
| CN | 105555312 | | 5/2016 | |
| CN | 105601638 | | 5/2016 | |
| CN | 105748439 | | 7/2016 | |
| CN | 107417706 | | 7/2019 | |
| DE | 2511077 | ‡ | 9/1976 | |
| EP | 0233701 | | 8/1987 | |
| EP | 0267778 | ‡ | 5/1988 | |
| EP | 0498231 | ‡ | 8/1992 | A01N 25/04 |
| EP | 0526206 | ‡ | 2/1993 | |
| EP | 0598515 | ‡ | 5/1994 | |
| EP | 0733066 | | 9/1996 | |
| EP | 0862857 | ‡ | 9/1998 | |
| EP | 0898957 A1 * | | 3/1999 | A61K 7/48 |
| EP | 1563734 | ‡ | 8/2005 | |
| EP | 1976861 | | 10/2008 | |
| EP | 2240767 | | 10/2010 | |
| EP | 2319484 A2 | | 5/2011 | |
| EP | 2943072 | | 11/2015 | |
| EP | 2954933 | | 12/2015 | |
| EP | 2954934 | | 12/2015 | |
| EP | 3142684 | | 3/2017 | |
| EP | 3237487 | | 11/2017 | |
| GB | 191208748 | ‡ | 4/1913 | |
| GB | 0745360 A | | 2/1956 | |
| GB | 0747909 A | | 4/1956 | |
| GB | 0748422 A | | 5/1956 | |
| GB | 0753976 A | | 8/1956 | |
| GB | 0758926 A | | 10/1956 | |
| GB | 0762866 A | | 12/1956 | |
| GB | 0763246 A | | 12/1956 | |
| GB | 0765459 A | | 1/1957 | |
| GB | 0792045 A | | 3/1958 | |
| GB | 1168913 | ‡ | 10/1969 | |
| GB | 1249674 A | | 10/1971 | |
| GB | 1417364 A | | 12/1975 | |
| GB | 1499397 A | | 2/1978 | |
| GB | 2123819 A | | 2/1984 | |
| GB | 2176493 A | | 12/1986 | |
| GB | 1044895 | ‡ | 10/1996 | |
| JP | 50-063141 A | | 5/1975 | |
| JP | 54-036205 B1 | | 11/1979 | |
| JP | 55-129213 A | | 10/1980 | |
| JP | 57-028184 A | | 2/1982 | |
| JP | 59-067205 A | | 4/1984 | |
| JP | 59-210007 A | | 11/1984 | |

(56) References Cited

FOREIGN PATENT DOCUMENTS

| | | | | |
|---|---|---|---|---|
| JP | S62-240601 | ‡ | 10/1987 | |
| JP | 02-138376 A | | 5/1990 | |
| JP | 03-183505 A | | 8/1991 | |
| JP | 03-221576 A | | 9/1991 | |
| JP | 04-128003 A | | 4/1992 | |
| JP | 1910962 | | 3/1995 | |
| JP | 07-179306 A | | 7/1995 | |
| JP | 2056091 | | 5/1996 | |
| JP | 08-218225 A | | 8/1996 | |
| JP | 10-029901 A | | 2/1998 | |
| JP | 11-137084 A | | 5/1999 | |
| JP | 11-349588 A | | 12/1999 | |
| JP | 2006-124337 A | | 5/2006 | |
| JP | 2008-502640 A | | 1/2008 | |
| NL | 8900381 A | | 9/1990 | |
| NO | 151687 B | * | 11/1980 | |
| SU | 1021415 A1 | | 6/1983 | |
| WO | 90/07272 A1 | | 7/1990 | |
| WO | 93/12175 A1 | | 6/1993 | |
| WO | 96/21353 A1 | | 7/1996 | |
| WO | 96/32010 A2 | | 10/1996 | |
| WO | 96/32011 A2 | | 10/1996 | |
| WO | 98/35561 A1 | | 8/1998 | |
| WO | WO 1999/063900 | | 12/1999 | |
| WO | 00/64257 A1 | | 11/2000 | |
| WO | 02/21913 A2 | | 3/2002 | |
| WO | 02/34047 A1 | | 5/2002 | |
| WO | 02/89573 A1 | | 11/2002 | |
| WO | 02/96199 A2 | | 12/2002 | |
| WO | 03/47558 A2 | | 6/2003 | |
| WO | 2003/101195 A1 | | 12/2003 | |
| WO | 2003/105587 A1 | | 12/2003 | |
| WO | 2004/030641 A1 | | 4/2004 | |
| WO | 2004/080177 A2 | | 9/2004 | |
| WO | 2005/009132 A1 | | 2/2005 | |
| WO | 2005/018324 A2 | | 3/2005 | |
| WO | 2005/055716 A2 | | 6/2005 | |
| WO | WO 2005048944 | | 6/2005 | |
| WO | 2005/082137 A1 | | 9/2005 | |
| WO | 2005/122771 A1 | | 12/2005 | |
| WO | WO 2005123105 | | 12/2005 | |
| WO | 2006/126211 A2 | | 11/2006 | |
| WO | 2007/054473 A1 | | 5/2007 | |
| WO | 2007/117720 A2 | | 10/2007 | |
| WO | 2007/136597 A2 | | 11/2007 | |
| WO | WO 2008014185 | ‡ | 1/2008 | |
| WO | WO 2008020872 | ‡ | 2/2008 | |
| WO | WO-2008030753 A2 | * | 3/2008 | A01N 25/04 |
| WO | 2008/073397 A1 | | 6/2008 | |
| WO | WO 2008069990 | ‡ | 6/2008 | |
| WO | 2009/080428 A1 | | 7/2009 | |
| WO | 2009/090181 A2 | | 7/2009 | |
| WO | WO 2009098223 | ‡ | 8/2009 | |
| WO | 2009/126370 A1 | | 10/2009 | |
| WO | 2009/139106 A1 | | 11/2009 | |
| WO | WO 2009137062 | | 11/2009 | |
| WO | WO-2009155693 A1 | * | 12/2009 | A01N 25/00 |
| WO | WO 2010/014728 | | 2/2010 | |
| WO | 2010/043447 A2 | | 4/2010 | |
| WO | 2010/132169 A1 | | 11/2010 | |
| WO | 2011/028987 A2 | | 3/2011 | |
| WO | 2011/070503 A1 | | 6/2011 | |
| WO | WO 2011/075805 | | 6/2011 | |
| WO | 2012/031355 A1 | | 3/2012 | |
| WO | 2012/040804 A2 | | 4/2012 | |
| WO | 2012/055991 A1 | | 5/2012 | |
| WO | WO2012126094 A1 | ‡ | 9/2012 | C05F 11/10 |
| WO | 2012/162844 A1 | | 12/2012 | |
| WO | 2012/162846 A1 | | 12/2012 | |
| WO | 2012/171126 A1 | | 12/2012 | |
| WO | WO 2013073998 | | 3/2013 | |
| WO | WO2013078546 A1 | ‡ | 6/2013 | C05B 17/00 |
| WO | WO 2013130510 | | 9/2013 | |
| WO | WO 2013192521 | | 12/2013 | |
| WO | 2014/139012 A1 | | 9/2014 | |
| WO | WO 2015081441 | | 6/2015 | |
| WO | WO 2015/106770 | | 7/2015 | |
| WO | WO 2017/035582 | | 3/2017 | |
| WO | WO 2017167992 | | 10/2017 | |
| WO | WO 2018135882 | | 7/2018 | |

OTHER PUBLICATIONS

"Auxin," Wikipedia [online]. Retrieved from the Internet: <URL: http://en.wikipedia.org/wiki/Auxin>, 12 pages, Retrieved on Apr. 9, 2015.‡

Engvild, "Herbicidal activity of 4-chloroindoleacetic acid and other auxins on pea, barley and mustard," Physiologia Plantarum, 96(2):333-337, Feb. 1996.‡

Holly Frontier®, "Sunspray Oils," 2014 [retrieved on Jul. 27, 2015]. Retrieved from the Internet: <URL: http://www.hollyfrontierlsp.com/Products/Horticultural-Oils/Sunspray-Oils/85/>, 1 page.‡

Colby, "Calculating synergistic and antagonistic responses of herbicide combinations," Weeds, Jan. 1967, 15(1): 4 pages.

Duke et al. "Photosensitizing Porphyrins as Herbicides," Naturally Occurring Pest Bioregulators, Jan. 9, 1991, 26(449):371-386.

Gomes et al., "Photodynamic inactivation of Penicillium chrysogenum conidia by cationic porphyrins," Photochemical & Photobiological Sciences, 2011, 10(11):1735-1743.

Guillaumot et al., "Synergistic enhancement of tolerance mechanisms in response to photoactivation of cationic tetra (N-methylpyridyl) porphyrins in tomato plantlets," Journal of Photochemistry and Photobiology B: Biology, Mar. 1, 2016, 156:69-78.

Hazen et al., "Adjuvants—Terminology, Classification, and Chemistry 1," Weed technology, Oct. 2000, 14(4): 13 pages.

Jesus et al., "An insight into the photodynamic approach versus copper formulations in the control of Pseudomonas syringae pv. actinidiae in kiwi plants," Photochemical & Photobiological Sciences, 2018, 17(2): 13 pages.

Larkin et al., "Tetrapyrrole signaling in plants," Frontiers in plant science, Oct. 19, 2016, 7(1586): 17 pages.

Nagahatenna et al., "Tetrapyrrole-based drought stress signalling," Plant biotechnology journal, May 2015, 13(4):447-459.

PCT International Preliminary Report on Patentability in International Appln. No. PCT/CA2019/050554, dated Nov. 12, 2020, 7 pages.

PCT International Preliminary Report on Patentability in PCT Appln. No. PCT/CA2018/050997, dated Feb. 18, 2020, 7 pages.

PCT International Search Report and Written Opinion in International Appln. No. PCT/CA2019/050554, dated Aug. 1, 2019, 8 pages.

PCT International Search Report and Written Opinion in PCT Appln. No. PCT/CA2018/050997, dated Nov. 14, 2018, 12 pages.

Phung et al., "Porphyrin biosynthesis control under water stress: sustained porphyrin status correlates with drought tolerance in transgenic rice," Plant physiology, Dec. 1, 2011, 157(4):1746-1764.

Szulbinski et al., "Electrochemical and photocatalytic properties of water-soluble tin (IV) meso-tetraanilinporphyrin," Journal of electroanalytical chemistry and interfacial electrochemistry, Jul. 10, 1987, 226(1-2):157-170.

Szulbinski et al., "Photoinduced reduction of water by tin (IV) and ruthenium (II) porphyrins," Inorganica chimica acta, Aug. 15, 1986, 118(2):91-97.

Vandresen et al., "In vitro photodynamic inactivation of conidia of the phytopathogenic fungus Colletotrichum graminicola with cationic porphyrins," Photochemical & Photobiological Sciences, 2016, 15(5):673-681.

Yang et al., "Physiological and metabolic effects of 5-aminolevulinic acid for mitigating salinity stress in creeping bentgrass," PLoS One, Dec. 31, 2014, 9(12):e116283, 25 pages.

Zhang et al., "Disinfection Effectiveness of Photodynamic Therapy Combined with EDTA on Infected Root Cancals in Vitro," Journal of Oral Science Research, Apr. 2014, 30(10): 317-320, English Abstract.

Zhang et al., "Role of 5-aminolevulinic acid in the salinity stress response of the seeds and seedlings of the medicinal plant Cassia obtusifolia L," Botanical studies, Dec. 2013, 54(1):1-13.

(56) References Cited

OTHER PUBLICATIONS agrilife.org [online], "Adjuvant", 2013, retrieved on May 27, 2022, retrieved from <URL: http://agrilife.org/fisheries2/files/2013/09/Adjuvants.pdf<, 3 pages.

Bhosale et al., "Supramolecular self-assembly of protoporphyrin IX amphiphiles into worm-like and particular aggregates," Supramolecular Chemistry, Mar. 1, 2011, ;23(03-04):263-268.

Chen et al., "Chlorin e6 131: 152-Anhydride: A Key Intermediate in Conjugation Reactions of Chlorin e6," European journal of organic chemistry, Jun. 2015, 2015(17):3661-3665.

Colby, "Calculating synergistic and antagonistic responses of herbicide combinations", Weed Science Society of America, Jan. 1967, 15(1); 20-22.

DeOliveira et al., "Chlorins: natural sources, synthetic developments and main applications," Current Organic Synthesis, Feb. 1, 2014, 11(1):42-58.

Guo et al., "Synergistic antiproliferative effect of chemo-phototherapy: Synthesis and photodynamic activity evaluation of novel Chlorin e6-artesunate conjugates as antiproliferative agents," Bioorganic & Medicinal Chemistry Letters, Oct. 1, 2017, 4 pages.

Jung et al., "Toxic tetrapyrrole accumulation in protoporphyrinogen IX oxidase-overexpressing transgenic rice plants," Plant molecular biology, Jul. 2008, 67(5):535-546.

Li et a l., "Self-assembled chlorin e6 conjugated chondroitin sulfate nanodrug for photodynamic therapy," Biomacromolecules, May 9, 2011, 12(5):1724-1730.

PCT International Preliminary Report on Patentability in International Application No. PCT/CA2020/050083, dated Apr. 21, 2021, 5 pages.

PCT International Search Report and Written Opinion in International Application No. PCT/CA2020/050083, dated Apr. 22, 2020, 10 pages.

Uchoa et al., "Relationship between structure and photoactivity of porphyrins derived from protoporphyrin IX," Journal of Porphyrins and Phthalocyanines, Sep. 2010, 14(09):832-845.

Yang et al., "Silica-hemin composite nanoparticles as new biocatalyst to highly sensitive determination of glucose in human serum," Analytical sciences, 2004, 20(9):1265-1270.

[No Author Listed], "AEROSIL® 200," Evonik Industries AG, Product Information Sheet, Aug. 2011, 2 pages.

International Preliminary Report on Patentability received for PCT Patent Application No. PCT/CA2012/050444, mailed on Dec. 9, 2014, 10 pages.

International Search Report and Written Opinion received for PCT Patent Application No. PCT/CA2012/050444, mailed on Feb. 27, 2013, 14 pages.

Mergos et al., "Dielectric properties of nanopowder emulsions in paraffin oil," 2011 IEEE International Conference on Dielectric Liquids, Sep. 8, 2011.

\* cited by examiner

‡ imported from a related application

A) Without anti-settling agent at 50x magnification

B) with anti-settling agent at 50x, not homogenized

C) with anti-settling agent at 50x, homogenized

FORMULATIONS CONTAINING PARAFFINIC OIL AND ANTI-SETTLING AGENT

CROSS REFERENCE TO RELATED APPLICATION

This application is a continuation of U.S. application Ser. No. 14/405,644, filed Aug. 9, 2016, which is a U.S. National Phase Application of International Patent Application No. PCT/CA2012/050444 filed Jun. 29, 2012, which claims the benefit of U.S. Provisional Application No. 61/655,417, filed on Jun. 4, 2012, the contents of both of which are incorporated herein by reference in their entirety.

TECHNICAL FIELD

This disclosure features combinations that include a paraffinic oil and one or more anti-settling agents, which are useful, e.g., for promoting the health of a plant (e.g., turf grass), e.g., controlling a disease, condition, or injury caused by a pest of a plant.

BACKGROUND

Grasses are often planted and maintained to provide aesthetically pleasing or recreationally useful groundcover for an area of land, which may be called a lawn, turf, pitch, field or green depending on the context. Species of grasses that are maintained in this way are sometimes referred to as turf grasses. Turf grass care and maintenance has a rich horticultural tradition, reflecting in part the numerous economic and environmental benefits provided by turf grasses (see, for example, Walsh, B. et al., *HortScience*, 34, 1999, 13-21).

A number of different management practices for controlling a variety of turfgrass pests are known. For example, cultural practices for maintaining turfgrass health may include the selection or substitution of turfgrass species or cultivars that are not susceptible to certain pests. Implementing a fertility program that promotes turfgrass vigor may also decrease the turfgrass' susceptibility to certain pests. Adjustment of mowing practices, for example, cut height and frequency, may also be included in a management program. Extended periods of leaf wetness may also render turfgrass more susceptible to disease. Accordingly, moisture management practices, including proper irrigation, drainage and dew removal may improve turfgrass health. Cultural practices for controlling turfgrass pests may also include proper thatch control and aerification.

In addition to cultural management practices, chemical pesticides have been developed and used to control plant pests. For example, a number of chemical fungicides based on similar or different modes of action are known. The use of conventional fungicides, however, has several disadvantages. For example, a number of conventional chemical fungicides are site specific in that they disrupt single metabolic processes or structure sites of the target fungus. Accordingly, strains may develop resistance to the fungicide after repeat applications. Conventional fungicides generally have a poor environmental profile and their use can be expensive. Thus, it is desirable to limit the amount of fungicide used. Furthermore, conventional fungicides are generally not acceptable for use in organic farming.

In an alternative approach to conventional chemical fungicides, oil-in-water emulsions comprising paraffinic oils and paraffinic spray oils have been used for controlling turfgrass pests (see, for example, Canadian Patent Application 2,472,806 and Canadian Patent Application 2,507,482). For example, Petro-Canada produces CIVITAS™, a broad spectrum fungicide and insecticide for use on golf course turf and landscape ornamentals, used for example to control powdery mildew, adelgids and webworms on landscape ornamentals (US EPA REG. NO. 69526-13). Product labeling indicates that CIVITAS™ may be applied as part of an alternating spray program or in tank mixes with other turf and ornamental protection products; and that CIVITAS™ may be used as a preventative treatment with curative properties for the control of many important diseases on turf, including fairways and roughs. In addition, oil-in-water formulations comprising paraffinic oils and a pigment for controlling turfgrass pests have been reported as well as stable composition concentrates including both the paraffinic oil and pigment in a single concentrate have been reported (see, for example, WO 2009/155693). For example, in addition to CIVITAS™, Petro-Canada produces a separate product, CIVITAS™ HARMONIZER, a pigment dispersion. Product labeling indicates that CIVITAS™ HARMONIZER is for use with CIVITAS™ for golf course applications.

SUMMARY

This disclosure features combinations that include one or more paraffinic oils and one or more anti-settling agents.

It has been observed previously that compositions having a paraffinic oil, an oil-dispersible pigment, a surfactant and a polyethylene glycol ("PEG") can be stored prior to application to a plant (e.g., a turf grass). These compositions are sometimes referred to as "one-pack formulations" and offer the safety and convenience of having all active components pre-mixed by a manufacturer instead of by the end user. However, while convenient, such compositions can sometimes produce an unacceptable color in the grass and/or cause phytotoxicity to the plant. The compositions may also form hard settling during storage. While not wishing to be bound by theory, it is believed that the foregoing could be caused, in part, by the presence of the polymer components used in the oil-dispersible pigment to facilitate the incorporation of the pigment into the composition.

It has also been observed previously that separately packaged and storable water-dispersible pigments can be combined with a paraffinic oil to form a mixture that is emulsified prior to application to a plant (e.g., a turf grass). The separately packaged water-dispersible pigment/separately packaged paraffinic oil combinations are sometimes referred to as "two-pack formulations" (e.g., CIVITAS™ 2-pack) and have been found to be generally effective for, e.g., promoting the health of a plant.

Attempts to combine the safety and convenience aspects of the one pack formulations with the performance aspects of the two-pack formulations (e.g., combining and emulsifying a water-dispersible pigment and a paraffinic oil for purposes of providing a storable emulsion) have resulted in products that tend to have commercially undesirable stability, shelf life, and/or performance. This is believed to be due primarily to the occurrence of irreversible coalescence and/or settling out of the pigment.

It has been surprisingly found that product stability, shelf life, and performance can be significantly enhanced by the inclusion of one or more anti-settling agents in combinations that include one or more pigments (e.g., in the form of water-based pigment dispersions) and one or more paraffinic oils.

As used herein, the term "anti-settling agent" refers to a dispersible substance, which when introduced into a solid (dispersed phase)-liquid (continuous phase) dispersion or suspension, substantially prevents the solid portion of said dispersion or suspension from undergoing coalescence, settling (e.g., due to gravity), and/or any other process(es) that cause(s) the solid portion to become a solid mass (e.g., a solid mass that is hard and/or compacted) that cannot be re-dispersed or re-suspended.

As used herein, the term "substantially prevents" means that the anti-settling agent prevents at least 50% (e.g., at least 60%, at least 70%, at least 80%, at least 90%, at least 95%, at least 99%) of the solid portion to become a solid mass (e.g., a hard and/or compact solid mass) that cannot be substantially re-dispersed or re-suspended (e.g., as determined by measuring the height of the solid settling in a clear bottle during storage test).

The pigments themselves tends to be generally heavy (e.g., has a higher density and/or specific gravity than the oil and water) and tend to settle to the bottom of the liquid medium when stored for extended periods in the absence of an anti-settling agent. It is believed that the anti-settling agents prevent these pigments from forming, e.g., a coalesced solid mass (e.g., a solid mass that is hard and/or compacted and cannot be re-dispersed or re-suspended). While not wishing to be bound by theory, it is believed that the presence of one or more anti-settling agents imparts rheological changes to the paraffinic oil-based combinations by forming a 3-dimensional structure in the oil, which reduces or slows down the settling of solids (e.g., pigments) in the combinations described herein (e.g., settling of one or more pigments, e.g., one or more pigments in the form of a water-based pigment dispersion). In some instances, it is believed that the anti-settling agents can impart such changes by binding to the pigment. In addition, even though some aggregation and dropout of solids (e.g., pigments) may occur, the presence of the anti-settling agent allows any aggregated solid to be re-dispersed through simple agitation. Solid (e.g., pigment) re-dispersion generally does not occur in the absence of the anti-settling agent.

It is also believed that subjecting the combinations to a high-shear processing step (e.g., using high speed mixers such as a dissolver, rotor-stator mixer, bead mill or homogenizer) can more efficiently disperse the anti-settling agent in the oil, and in some instances, reduce the particle size of solids in the combinations that tend to settle (e.g., reduce the particle size of the one or more pigments, e.g., reduce the particle size of the one or more pigments in the form of a water-based pigment dispersion).

Advantageously, the irreversible drop-out of solid aggregates is reduced or slowed in the combinations described herein, which enhances the stability of the combinations and can further extend their useful shelf life.

The combinations typically further include (but are not limited to) one or more of the following: one or more emulsifiers, one or more pigments (e.g., a water-based pigment dispersion), one or more silicone surfactants, one or more other chemical fungicides, and water.

This disclosure features stable and storable combinations that include one or more water-based pigment dispersions. Typically, such combinations are prepared by processes that include emulsification of the combinations followed by mechanical dispersion of the resultant emulsions.

Methods of formulating combinations that include both oil and water as oil-in-water (O/W) emulsions are also featured.

In some implementations, the combinations can be in the form of a single composition (e.g., a concentrate, e.g., which is contained within a storage pack or a vessel (e.g., a tank) suitable for applying the composition to a plant, e.g., turf grass). The components that form part of said single composition can affect, e.g., controlling a disease, condition, or injury caused by a pest of a plant. The combinations described herein therefore provide ease-of-use since the components, which achieve, e.g., the controlling a disease, condition, or injury caused by a pest of a plant, are present in a single composition and need not be combined by the end-user.

In some implementations, the composition is a concentrate. As used herein, the term "concentrate" refers to a combination (e.g., a single composition) that is free of water or includes small amounts of water (e.g., 3 parts per weight) due primarily to the inclusion of water from a water-based pigment dispersion. Typically, such compositions are applied to a plant (e.g., turf grass) after dilution with water.

In some implementations, the combinations described herein can be prepared, stored, and transported in concentrated (e.g., undiluted) form (and still, e.g., exhibit one or more of the advantages described above), which conveniently reduces the volume of product sold to, and manipulated by, the end-user.

This disclosure also features methods of using the combinations for promoting health of a plant (e.g., turf grass), including but not limited to controlling a disease, condition, or injury caused by a pest of a plant. Also featured are uses of the combinations for promoting health of a plant (e.g., turf grass), including but not limited to controlling a disease, condition, or injury caused by a pest of a plant (as well as uses in the manufacture of a composition for such purposes). In some implementations, other conventional agent(s) can be included for such a purpose.

In one aspect, a composition is featured, which includes a paraffinic oil, an emulsifier, a pigment, a silicone surfactant, and an anti-settling agent.

In one aspect, an emulsified composition is featured, which includes:
(i) a paraffinic oil continuous phase;
(ii) an aqueous dispersed phase;
(iii) a first dispersible solid; and
(iv) a second dispersible solid;
wherein:
(a) the first dispersible solid comprises a water dispersible pigment, which is dispersed within the aqueous dispersed phase; and
(b) the second dispersible solid comprises an anti-settling agent, which is dispersed within the paraffinic oil continuous phase and the aqueous dispersed phase and is present in an amount sufficient to prevent at least 50 percent of the water dispersible pigment from coalescing and/or settling out of the aqueous dispersed phase and forming a non-dispersible solid mass of the water dispersible pigment.

The methods described herein are useful for promoting the health of a plant (e.g., controlling a disease, condition, or injury caused by a pest of a plant; e.g., controlling a disease caused by fungal pathogen; e.g., controlling infection of a plant by a fungal pathogen; e.g., controlling infection of a plant by a biotic agent). Such methods are featured in this disclosure along with uses of the combinations (e.g., compositions, e.g., fungicidal compositions) for any one or more of the above-described utilities.

In one aspect, methods for promoting the health of a plant (e.g., methods of controlling a disease, condition, or injury caused by a pest of a plant; e.g., controlling a disease caused by fungal pathogen; e.g., controlling infection of a plant by a fungal pathogen; e.g., controlling infection of a plant by a biotic agent) are featured, which include applying a combination (e.g., a composition, e.g., a concentrate, e.g., as a packaged product) as described anywhere herein to a plant (e.g., turf grass).

In another aspect, uses of a combination (e.g., a composition, e.g., a concentrate, e.g., as a packaged product) as described anywhere herein are featured for promoting the health of a plant (e.g., turf grass) (e.g., controlling a disease, condition, or injury caused by a pest of a plant; e.g., controlling a disease caused by fungal pathogen; e.g., controlling infection of a plant by a fungal pathogen; e.g., controlling infection of a plant by a biotic agent) are featured.

In one aspect, methods are featured, which include:
(i) mixing a paraffinic oil, an emulsifier, a pigment, a silicone surfactant, and an anti-settling agent to form a first mixture; and
(ii) homogenizing the first mixture formed in step (i) to form a second mixture.

In another aspect, methods are featured, which include:
(i) mixing a paraffinic oil, an emulsifier, a silicone surfactant, and an anti-settling agent to form a first mixture (e.g., an emulsion); and
(ii) introducing a pigment (e.g., a water-based pigment dispersion) into the first mixture using a shear stress (e.g., homogenization, mechanical shearing, grinding/milling) to form a second mixture (e.g., a dispersed emulsion).

In a further aspect, methods are featured, which include:
(i) mixing a paraffinic oil, an emulsifier, a pigment, a silicone surfactant, and an anti-settling agent to form a first mixture; and
(ii) applying a shear stress (e.g., homogenization, mechanical shearing, grinding/milling) to the first mixture formed in step (i) to form a second mixture.

In one aspect, methods are featured, which include:
(i) providing a first mixture that comprises one or more of the following: a paraffinic oil, an emulsifier, a silicone surfactant, and an anti-settling agent; and
(ii) applying a shear stress to the first mixture provided in step (i) to form a second mixture.

Combinations prepared by the methods described above (and anywhere herein) are also featured. Also featured are methods of providing a shelf-stable pigment emulsion, which include the methods described above (and anywhere herein).

Implementations of the compositions, methods, and/or uses can include any one or more of the following features.

The weight ratio of the paraffinic oil to the emulsifier can be from 10:1 to 500:1. For example, the weight ratio of the paraffinic oil to the emulsifier can be 50:1.

The paraffinic oil includes a paraffin having from 16 carbon atoms to 35 carbon atoms.

The paraffinic oil has a paraffin content of at least 80%.

The paraffinic oil includes synthetic isoparaffins.

The paraffinic oil can be N65DW.

The emulsifier includes a natural or synthetic alcohol ethoxylate, an alcohol alkoxylate, an alkyl polysaccharide, a glycerol oleate, a polyoxyethylene-polyoxypropylene block copolymer, an alkyl phenol ethoxylate, a polymeric surfactant, a polyethylene glycol, a sorbitan fatty acid ester ethoxylate, or a composition thereof. The emulsifier includes a natural or synthetic alcohol ethoxylate.

The emulsifier can be Atlox 3273.

The pigment is a polychlorinated (Cu II) phthalocyanine.

The weight ratio of the paraffinic oil to the pigment can be from 5:1 to 100:1. For example, the weight ratio of the paraffinic oil to the pigment can be 30:1.

The pigment can be a water-based pigment dispersion (or sometimes referred to as a water-dispersible pigment).

The pigment can be an oil-based pigment dispersion (or sometimes referred to as an oil-dispersible pigment).

The pigment can be GCDPC60.

The pigment can be stably dispersed in the composition.

No visually detectable hard aggregation of the pigment (e.g. water dispersible pigment) occurs for at least 60 days (e.g., at least 90 days, at least 120 days, at least 6 months).

Any pigment (e.g., water dispersible pigment) that has aggregated can be re-dispersed by agitation of the composition.

The water dispersible pigment has a particle size of not more than 100 micrometers (e.g., from 50% to 99% of the water dispersible pigment has a particle size of not more than 100 micrometers).

The silicone surfactant can be a silicone polyether.

The silicone surfactant further includes a polyethylene glycol according to formula IV:

$R^1$—O—$(CH_2CH_2O)_f$—$R^2$ wherein $R^1$=H or $CH_2$=CH—$CH_2$ or $COCH_3$; $R^2$=H or $CH_2$=CH—$CH_2$ or $COCH_3$; and $f \geq 1$.

The weight ratio of the pigment to the silicone surfactant can be from 2:1 to 20:1. For example, the weight ratio of the pigment to the silicone surfactant can be 3.5:1.

The silicone surfactant and polyethylene glycol can be Silwet L-77.

The anti-settling agent can be a metal oxide or an organically modified clay. The anti-setting agent can be a metal oxide. The anti-setting agent can be a fumed metal oxide or a precipitated metal oxide (e.g., fumed silica or precipitated silica). The anti-settling agent can be fumed silica.

The anti-settling agent can be present in an amount sufficient to prevent at least 60 percent (e.g., at least 70 percent, at least 80 percent, at least 90 percent, at least 95 percent, at least 99 percent) of the water dispersible pigment from coalescing and/or settling out of the aqueous dispersed phase and forming a non-dispersible solid mass of the water dispersible pigment.

At least one anti-settling agent particle binds directly or indirectly to one or more water dispersible pigment particles.

The weight ratio of the paraffinic oil to the anti-settling agent can be from 5:1 to 100:1. For example, the weight ratio of the paraffinic oil to the anti-settling agent can be 50:1.

The anti-settling agent can be Aerosil 200.

The composition can include:

| | |
|---|---|
| paraffinic oil | 50 to 300 parts per weight |
| emulsifier | 1 to 10 parts per weight |
| pigment | 1 to 10 parts per weight |
| silicone surfactant and polyethylene glycol | 0.1 to 10 parts per weight |
| anti-settling agent | 0.5 to 20 parts per weight |

For example, the composition can include:

| | |
|---|---|
| paraffinic oil | 100 parts per weight |
| emulsifier | 2 parts per weight |

-continued

| | |
|---|---|
| pigment | 3.5 parts per weight |
| silicone surfactant and polyethylene glycol | 1 parts per weight |
| anti-settling agent | 2 parts per weight |

The composition can include:

| | |
|---|---|
| paraffinic oil | 85 weight percent to 95 weight percent |
| emulsifier | 1 weight percent to 2.5% weight percent |
| pigment | 2 weight percent to 3 weight percent |
| silicone surfactant and polyethylene glycol | 1 weight percent to 2 weight percent |
| anti-settling agent | 1 weight percent to 2.5 weight percent |

In certain implementations, the remaining balance of material is water when the pigment is a water-based pigment dispersion. In other implementations, the remaining balance of material is oil when the pigment is an oil-based pigment dispersion. In certain implementations, the remaining balance of material is water when the pigment is a water-based pigment dispersion; or the remaining balance of material is oil when the pigment is an oil-based pigment dispersion; and other inert materials such as biocide and/or other solvents.

For example, the composition can include:

| | |
|---|---|
| paraffinic oil (e.g., N65DW, Petro-Canada) | 89 weight percent |
| Emulsifier (e.g., Atlox 3273, Croda) | 1.8 weight percent |
| Pigment (e.g., GCDPC60, SunChemical) | 2.5 weight percent |
| silicone surfactant and polyethylene glycol (e.g., Silwet L-77, Momentive) | 1.2 weight percent |
| anti-settling agent (e.g., Aerosil 200, Evonik) | 1.5 weight percent |

In certain implementations, the remaining balance of material is water when the pigment is a water-based pigment dispersion. In other implementations, the remaining balance of material is oil when the pigment is an oil-based pigment dispersion.

The paraffinic oil can be N65DW. The emulsifier can be Atlox 3273. The pigment can be GCDPC60. The silicone surfactant and polyethylene glycol can be Silwet L-77. The anti-settling agent can be Aerosil 200.

The paraffinic oil can be N65DW, and the emulsifier can be Atlox 3273.

The paraffinic oil can be N65DW, the emulsifier can be Atlox 3273, and the pigment can be GCDPC60.

The paraffinic oil can be N65DW, the emulsifier can be Atlox 3273, the pigment can be GCDPC60, and the silicone surfactant and polyethylene glycol can be Silwet L-77.

The paraffinic oil can be N65DW, the emulsifier can be Atlox 3273, the pigment can be GCDPC60, the silicone surfactant and polyethylene glycol can be Silwet L-77, and the anti-settling agent can be Aerosil 200.

The composition can further include one or more other chemical fungicides.

The one or more other chemical fungicides can be selected from DMI fungicides, carboximide, dicarboximide, and MBC. The one or more other chemical fungicides can be a DMI fungicide (e.g., propioconozole).

The composition can further include water. The composition can be an oil-in-water emulsion.

The composition can be prepared by applying shear stress to the composition.

The pest can be selected from the group consisting of fungi, bacteria, viruses, spiders, ticks, mites, nematodes, gastropods and insects.

The pest can be selected from the group consisting of fungi, ticks, mites, gastropods and insects.

The pest can be selected from the group consisting of bluegrass weevils, cutworms, sod webworms, pillbugs, grubs, aphids, mites, chinch bugs, chafers, beetles, grasshoppers, scales, craneflies, earwigs, slugs, ants, fleas, mealybugs and ticks.

The pest can be selected from the group consisting of annual blue grass weevils, banks grass mites, mealybugs, mites, cutworms, sod webworms and fall armyworms.

The pest can be selected from the group consisting of a fungus that causes anthracnose, a fungus that causes brown patch, a fungus that causes dollar spot, a fungus that causes gray leaf spot, a fungus that causes crown rust, a fungus that causes *Fusarium* patch, a fungus that causes large patch of *Zoysia*, a fungus that causes leaf spot, a fungus that causes necrotic ring, a fungus that causes powdery mildew, a fungus that causes red thread, a fungus that causes pink snow mold, a fungus that causes grey snow mold, a fungus that causes southern blight, a fungus that causes spring dead spot, a fungus that causes summer patch, a fungus that causes yellow turf, a fungus that causes *Pythium* foliar blight, a fungus that causes pink patch, a fungus that causes leaf blight, a fungus that causes yellow patch, a fungus that causes downey mildew, a fungus that causes *Pythium* blight, a fungus that causes rusts, a fungus that causes stripe smut, a fungus that causes summer leaf spot, a fungus that causes take-all patch and a fungus that causes microdochium patch.

The pest can be selected from the group consisting of a fungus that causes anthracnose, a fungus that causes brown patch, a fungus that causes crown rust, a fungus that causes dollar spot, a fungus that causes *Fusarium* patch, a fungus that causes gray leaf spot, a fungus that causes large patch of *Zoysia*, a fungus that causes leaf spot, a fungus that causes melting-out, a fungus that causes necrotic ring, a fungus that causes powdery mildew, a fungus that causes red thread, a fungus that causes grey snow mold, a fungus that causes pink snow mold, a fungus that causes southern blight, a fungus that causes spring dead spot and a fungus that causes summer patch.

The plant can be a turfgrass or a crop plant.

The plant can be a tree.

The turfgrass can be selected from the group consisting of bentgrass, ryegrass, Kentucky bluegrass, annual bluegrass, Bermudagrass, *Paspalum*, zoysiagrass, fescues, bahiagrass, St. Augustinegrass, centipedegrass, buffalo grass, blue grama, wheatgrass, carpetgrass, buffo and beachgrass.

The turfgrass can be selected from the group consisting of bentgrass, ryegrass, Kentucky bluegrass, annual bluegrass, Bermuda grass, *Paspalum* and zoysiagrass.

The crop plant can be selected from the group consisting of wheat, soybean and rice.

The pigment in the methods described herein can be a water-dispersible pigment.

The first mixture can be an emulsion.

Applying the shear stress to the first mixture can include one or more of the following: homogenizing the first mixture; mechanical shearing of the first mixture; or grinding and/or milling the first mixture.

The second mixture can be a dispersed emulsion.

The components that are present in the first mixture can all be added at once and mixed; or some of the components can be added and mixed followed by the addition and mixing in of one or more other components.

The first mixture can include a paraffinic oil, an emulsifier, and an anti-settling agent.

The method can further include adding a silicone surfactant and a pigment prior to and/or during the applying the shear stress to the first mixture.

The first mixture can include a paraffinic oil, an emulsifier, and an anti-settling agent, and the method can further include adding a silicone surfactant and a pigment prior to and/or during the applying the shear stress to the first mixture.

The first mixture can include: a paraffinic oil, an emulsifier, a silicone surfactant, and an anti-settling agent.

The providing step can include (a) mixing together the paraffinic oil, the emulsifier, and the silicone surfactant; and (b) adding the anti-settling agent to the paraffinic oil/emulsifier/silicone surfactant mixture formed in (a).

The first mixture can include: a paraffinic oil, an emulsifier, a silicone surfactant, and an anti-settling agent, and the providing step can include (a) mixing together the paraffinic oil, the emulsifier, and the silicone surfactant; and (b) adding the anti-settling agent to the paraffinic oil/emulsifier/silicone surfactant mixture formed in (a).

The methods can further include adding the pigment prior to and/or during the applying the shear stress to the first mixture.

The first mixture can include: a paraffinic oil and an emulsifier.

The method can further include adding the pigment and the silicone surfactant prior to and/or during the applying of the shear stress to the first mixture.

The first mixture can include: a paraffinic oil and an emulsifier, and the method can further include adding the pigment and the silicone surfactant prior to and/or during the applying of the shear stress to the first mixture.

The methods can further include adding an anti-settling agent to the second mixture formed in (ii).

The methods further include mixing the second mixture with water for a time sufficient to form an oil-in-water emulsion.

The paraffinic oil and the pigment exhibit a greater than additive effect in controlling a disease, condition, or injury caused by a pest of a plant.

The paraffinic oil and the pigment exhibit a synergistic effect in controlling a disease, condition, or injury caused by a pest of a plant.

Definitions

As used herein, the term "oil-in-water emulsion" refers to a mixture in which one of the paraffinic oil and water (e.g., the paraffinic oil) is dispersed as droplets in the other (e.g., the water). In some implementations, an oil-in-water emulsion is prepared by a process that includes combining the paraffinic oil, water, and any other components and the paraffinic oil and applying shear until the emulsion is obtained. Typically a white milky color is indicative of the formation of an emulsion in the absence of any pigment; and a green color is observed in the presence of a pigment. In other implementations, an oil-in-water emulsion is prepared by a process that includes combining the paraffinic oil, water, and any other components in the mixing tank and sprayed through the nozzle of a spray gun.

As used herein, the term "controlling infection of a plant by a biotic agent" (and the like) means to diminish, ameliorate, or stabilize the infection and/or any other existing unwanted condition or side effect that is caused by the association of a pest organism with the plant include fungi, oomycetes, bacteria, viruses, viroids, virus-like organisms, phytoplasmas, protozoa, nematodes, parasitic plants and insects.

As used herein, the term "control a fungal pathogen of a plant" or "control a disease caused by a fungal pathogen" (and the like) means to diminish, ameliorate, or stabilize the disease and/or any other existing unwanted condition or side effect that is caused by the association of a fungal pathogen with the plant.

As used herein, the term "controlling infection of a plant by a fungal pathogen" (and the like) means to diminish, ameliorate, or stabilize the infection and/or any other existing unwanted condition or side effect that is caused by the association of a fungal pathogen with the plant.

As used herein, the term "controlling a disease, condition, or injury caused by a pest of a plant" (and the like) means to diminish, ameliorate, or stabilize the disease, condition, or injury and/or any other existing, unwanted condition(s) or side effect(s) that caused by the association of a pest of a plant with the plant.

As used herein, the term "pest of a plant" (and the like) is used to refer to living organisms occurring on plants that are not desired to occur on plants or that cause injury or disease to plants. Examples include fungi, bacteria, viruses, spiders, ticks, mites, nematodes, gastropods and insects.

As used herein, the term "turf grass" refers to a cultivated grass that provides groundcover, for example a turf or lawn that is periodically cut or mowed to maintain a consistent height. Grasses belong to the Poaceae family, which is subdivided into six subfamilies, three of which include common turf grasses: the Festucoideae subfamily of cool-season turf grasses; and the Panicoideae and Eragrostoideae subfamiles of warm-season turf grasses. A limited number of species are in widespread use as turf grasses, generally meeting the criteria of forming uniform soil coverage and tolerating mowing and traffic. In general, turf grasses have a compressed crown that facilitates mowing without cutting off the growing point. In the present context, the term "turf grass" includes areas in which one or more grass species are cultivated to form relatively uniform soil coverage, including blends that are a combination of differing cultivars of the same species, or mixtures that are a combination of differing species and/or cultivars.

Examples of turf grasses include, without limitation:

- bluegrasses (*Poa* spp.), such as kentucky bluegrass (*Poa pratensis*), rough bluegrass (*Poa trivialis*), Canada bluegrass (*Poa compressa*), annual bluegrass (*Poa annua*), upland bluegrass (*Poa* glaucantha), wood bluegrass (*Poa nemoralis*), bulbous bluegrass (*Poa bulbosa*), Big Bluegrass (*Poa ampla*), Canby Bluegrass (*Poa canbyi*), Pine Bluegrass (*Poa scabrella*), Rough Bluegrass (*Poa trivialis*), Sandberg Bluegrass (*Poa secunda*);
- the bentgrasses and Redtop (*Agrostis* spp.), such as creeping bentgrass (*Agrostis palustris*), colonial bentgrass (*Agrostis capillaris*), velvet bentgrass (*Agrostis canina*), South German Mixed Bentgrass (*Agrostis* spp. including *Agrostis tenius, Agrostis canina*, and *Agrostis palustris*), Redtop (*Agrostis alba*), Spike Bentgrass (*Agrostis exerata*);
- the fescues (*Festucu* spp.), such as red fescue (*Festuca rubra* spp. *rubra*) creeping fescue (*Festuca rubra*), chewings fescue (*Festuca rubra commutata*), sheep fescue (*Festuca ovina* var. *ovina*), hard fescue (*Festuca longifolia*), hair fescue (*Festucu capillata*), tall fescue (*Festuca arundinacea*), meadow fescue (*Festuca elatior*), Arizona Fescue (*Festuca arizonica*), Foxtail Fescue (*Festuca megalura*), Idaho Fescue (*Festuca idahoensis*), Molate Fescue (*Fescue rubra*);

the ryegrasses (*Lolium* spp.), such as annual ryegrass (*Lolium multiflorum*), perennial ryegrass (*Lolium perenne*), and italian ryegrass (*Lolium multiflorum*);

the wheatgrasses (*Agropyron* spp.), such as crested wheatgrass (*Agropyron cristatum*), desert wheatgrass (*Agropyron desertorum*), western wheatgrass (*Agropyron smithii*), Intermediate Wheatgrass (*Agropyron intermedium*), Pubescent Wheatgrass (*Agropyron trichophorum*), Slender Wheatgrass (*Agropyron trachycaulum*), Streambank Wheatgrass (*Agropyron riparium*), Tall Wheatgrass (*Agropyron elongatum*), and Bluebunch Wheatgrass (*Agropyron spicatum*);

beachgrass (*Ammophila breviligulata*);

Brome grasses (*Bromus* spp.), such as Arizona Brome (*Bromus arizonicus*), California Brome (*Bromus carinatus*), Meadow Brome (*Bromus biebersteinii*), Mountain Brome (*Bromus marginatus*), Red Brome (*Bromus rubens*), and smooth bromegrass (*Bromus inermis*);

cattails such as Timothy (*Phleum pratense*), and sand cattail (*Phleum subulatum*); orchardgrass (*Dactylis glomerata*);

Alkaligrass (*Puccinellia distans*);

crested dog's-tail (*Cynosurus cristatus*);

Bermudagrass (*Cynodon* spp. such as *Cynodon dactylon*); hybrid bermudagrass such as tifdwarf bermudagrass, ultradwarf bermudagrass, tifgreen bermudagrass, tifsport bermudagrass, GN-1 bermudagrass, Ormond bermudagrass, and tifway bermudagrass;

Zoysiagrasses (*Zoysia* spp.) such as *Zoysia japonica, Zoysia matrella*, and *Zoysia tenuifolia;*

St. Augustinegrass (*Stenotaphrum secundatum*) such as Bitter Blue St. Augustinegrass, Seville St. Augustinegrass, Floratam St. Augustinegrass, Floralawn St. Augustinegrass, Floratine St. Augustinegrass, Raleigh St. Augustinegrass, and Texas Common St. Augustinegrass;

Centipedegrass (*Eremochloa ophiuroides*);

Carpetgrass (*Axonopus fissifolius*);

Bahiagrass (*Paspalum notatum*);

Kikuyugrass (*Pennisetum clandestinum*);

Buffalograss (*Buchloe dactyloids*);

Seashore *Paspalum* (*Paspalum vaginatum*); Blue Grama (*Bouteloua gracilis*); Black Grama (*Bouteloua eriopoda*); Sideoats Grama (*Bouteloua curtipendula*);

*Sporobolus* spp., such as Alkali Sacaton (*Sporobolus airiodes*);

Sand Dropseed (*Sporobolus cryptandrus*), and Prairie Dropseed (*Sporobolus heterolepis*);

*Hordeum* spp., such as California Barley (*Hordeum californicum*),

Common Barley (*Hordeum vulgare*), and Meadow Barley (*Hordeum brachyantherum*);

*Alopecurus* spp., such as Creeping Foxtail (*Alopecurus arundinaceaus*), and Meadow Foxtail (*Alopecurus pratensis*);

*Stipa* spp., such as Needle & Thread (*Stipa comata*), Foothill Needlegrass (*Stipa lepida*), Green Needlegrass (*Stipa viridula*), Nodding Needlegrass (*Stipa cernua*), and Purple Needlegrass (*Stipa pulchra*);

*Elymus* spp., such as Blue Wildrye (*Elymus glaucus*), Canada Wildrye (*Elymus Canadensis*), Creeping Wildrye (*Elymus triticoides*), and Russian Wildrye (*Elymus junceus*);

Buffelgrass (*Cenchrus ciliaris*);

Big Quaking Grass (*Briza maxima*);

Big Bluestem (*Andropogon gerardii*),

Little Bluestem (*Schizachyruim scoparium*, and Sand Bluestem (*Andropogon hallii*);

Deergrass (*Muhlenbergia rigens*);

Eastern Gamagrass (*Tripsacum dactyloides*);

Galleta (*Hilaria jamesii*);

Tufted Hairgrass (*Deschampsia caespitosa*);

Indian Rice Grass (*Oryzopsis hymenoides*);

Indian Grass (*Sorghastrum nutans*);

Sand Lovegrass (*Eragrostis trichodes*); Weeping Lovegrass (*Eragrostis curvula*);

California Melic (*Melica californica*);

Prairie Junegrass (*Koeleria pyramidata*);

Prairie Sandreed (*Calamovilfa longifolia*);

Redtop (*Agrostis alba*);

Reed Canarygrass (*Phalaris arundinacea*);

Sloughgrass (*Spartina pectinata*);

Green Sprangletop (*Leptochloa dubia*);

Bottlebush Squirreltail (*Sitanion hystrix*);

*Panicum* Switchgrass (*virgatum*); and

Purple Threeawn (Aristida *purpurea*).

As used herein, the term "crop plant" refers to a non-woody plant, which is grown, tended to, and harvested in a cycle of one year or less as source of foodstuffs and/or energy. Examples of crop plants include, without limitation, sugar cane, wheat, rice, corn (maize), potatoes, sugar beets, barley, sweet potatoes, cassava, soybeans, tomatoes, legumes (beans and peas).

As used herein, the term "tree" refers to a woody perennial plant having a single stem or trunk and bearing lateral branches at some distance from the ground. In certain implementations, the tree is deciduous. In other implementations, the tree is evergreen (e.g., coniferous). In still other implementations, the tree is deciduous or evergreen and is grown, tended to, and harvested in a cycle of one year or less as source of foodstuffs. In a further implementation, the plant is a shrub. Examples of trees include, without limitation, maple trees, citrus trees, apple trees, pear trees, an oak tree, an ash tree, a pine tree, and a spruce tree.

The details of one or more implementations of the combinations and methods described herein are set forth in the accompanying description below. Other features and advantages of the combinations and methods described herein will be apparent from the description and drawings, and from the claims.

DETAILED DESCRIPTION

Figure 1A:
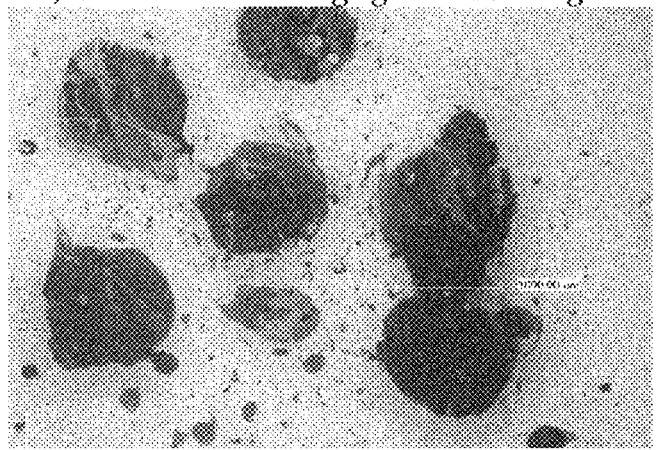
FIG. 1A is an image of a combination that does not include an anti-settling agent at 50× magnification.

This disclosure features combinations that include one or more paraffinic oils and one or more anti-settling agents. The combinations typically further include (but are not limited to) one or more of the following: one or more emulsifiers, one or more pigments, one or more silicone surfactants, one or more other chemical fungicides, and water. In some implementations, the combinations can be in the form of a single composition (e.g., a concentrate, e.g., which is contained within a storage pack or a vessel (e.g., a tank) suitable for applying the composition to a plant, e.g., turf grass). Typically, such compositions are applied to a plant (e.g., turf grass) after dilution with water. This disclosure also features methods of using the combinations for promoting health of a plant (e.g., turf grass), such as controlling a disease, condition, or injury caused by a pest of a plant. In some implementations, other conventional agents can be included for such a purpose. Methods of formulating combinations that include both oil and water as oil-in-water (O/W) emulsions are also featured.

I. Components

[A] Paraffinic Oil

The paraffinic oil confers properties (e.g., fungicidal properties) that are useful for promoting the health of a plant (e.g., turf grass). While not wishing to be bound by theory, it is believed that the paraffinic oil is able to provoke an induced systemic resistance (ISR) response, a systemic acquired resistance (SAR), or other defense response in a plant.

In some implementations, the paraffinic oil includes an oil enriched in paraffin.

In certain implementations, the paraffinic oil includes a paraffin having from 12 carbon atoms to 50 carbon atoms (e.g., 12 carbon atoms to 40 carbon atoms, 16 carbon atoms to 35 carbon atoms, 12 carbon atoms to 21 carbon atoms; e.g., 16 carbon atoms to 35 carbon atoms).

In certain implementations, the paraffinic oil includes a paraffin having an average number of carbon atoms that is less than or equal to about 20 (e.g., 16).

In certain implementations, the paraffinic oil includes a paraffin having an average number of carbon atoms of from 16 to 30 e.g., 23 or 27).

In certain implementations, the paraffinic oil includes a paraffin having from 16 carbon atoms to 35 carbon atoms and an average number of carbon atoms of 23.

In certain implementations, the paraffin is an isoparaffin (e.g., a synthetic isoparaffin manufactured from two-stage Severe Hydrocracking/Hydroisomerization process).

In some implementations, a paraffin is present in the paraffinic oil in an amount, that is at least 80% (e.g., at least 90%, at least 99%).

In some implementations, the paraffinic oil has been refined to remove compounds that are associated with plant injury, for example, aromatic compounds or compounds containing sulfur, nitrogen, or oxygen. In certain implementations, the paraffinic oil includes relatively low levels of aromatic compounds and/or compounds containing sulfur, nitrogen, or oxygen, e.g., less than 10 weight percent (less than 5 weight percent, less than 2 weight percent, less than 0.5 weight percent) of aromatic compounds and/or compounds containing sulfur, nitrogen, or oxygen.

Non-limiting examples of suitable paraffinic oils include, HT60, HT100, High Flash Jet, LSRD, and N65DW (available from Petro-Canada, Calgary, AB, Canada). In certain implementations, the paraffinic oil is N65DW.

[B] Emulsifier

In some implementations, the combinations include paraffinic oil, emulsifier, and water. It can be advantageous to store and/or apply such combinations as oil-in-water (O/W) emulsions.

Emulsions tend to be thermodynamically unstable due to excess free energy associated with the surface of the dispersed droplets such that the particles tend to flocculate (clumping together of dispersed droplets or particles) and subsequently coalesce (fusing together of agglomerates into a larger drop or droplets) to decrease the surface energy. If these droplets fuse, the emulsion will "break" (i.e., the phases will separate) destroying the emulsion, which in some cases can be detrimental to the storage shelf-life of the combinations. While not wishing to be bound by theory, it is believed that the addition of one (or more) emulsifying agents or emulsifiers can prevent or slow the "breaking" of an emulsion. As the skilled artisan will appreciate, the type and concentration of a particular emulsifying agent will depend, inter alia, on the emulsion phase components and the desired result.

In some implementations, the emulsifier is a "fast break" or "quick break" emulsifier. While not wishing to be bound by theory, it is believed that a "fast break" or "quick break" emulsifier allows the paraffinic oil to be quickly released from the O/W emulsion upon application to the plant for contact, e.g., with a plant pest. When a "fast break" or "quick break" emulsifier is present in a suitable amount (for example a selected proportion or ratio with respect to the paraffinic oil), the resulting "fast break" or "quick break" O/W emulsion quickly releases the oil phase upon application to the turfgrass. As such, there is less runoff of the O/W emulsion from, e.g., the grass blades (as compared to more stable O/W emulsions) resulting in more oil adhering to the plant, e.g., turfgrass for a longer period of time to more effectively contact and control, e.g., associated fungal pathogen. In certain implementations, the oil phase resides on the plant, e.g., turfgrass for a period of not less than one hour. In certain implementations, the oil phase resides on the plant, e.g., turfgrass for a period of from not less than 1 hour but not more than 30 days. In certain implementations, the "fast break" or "quick break" emulsion may be, for example, an emulsion having an oil phase that, after mixing with water, is reconstituted in 0.5 to 15 minutes according to the following test:

1. Fill 100 mL graduated cylinder with tap water.
2. Add 1 mL of emulsified oil.
3. Invert graduated cylinder 5 times.
4. Using a stop watch and human observation, measure how long it takes for the oil phase to reconstitute after inversion (step 3).

In some implementations, the oil phase is reconstituted in from 2 minutes to 5 minutes according to the test described above. In some instances, the "fast break" or "quick break" property of the O/W emulsion is balanced with the need to provide an O/W emulsion with a suitable shelf life under suitable storing conditions, and for a suitable timeframe.

In some implementations, the emulsifier is (or includes) one (or more of the following) a natural or synthetic alcohol ethoxylate, an alcohol alkoxylate, an alkyl polysaccharide, a glycerol oleate, a polyoxyethylene-polyoxypropylene block copolymer, an alkyl phenol ethoxylate, a polymeric surfactant, a polyethylene glycol, a sorbitan fatty acid ester ethoxylate, or any combination thereof.

In certain implementations, the emulsifier is (or includes) a natural or synthetic alcohol ethoxylate, a polymeric surfactant, a sorbitan fatty acid ester, or any combination thereof.

In certain implementations, the natural or synthetic alcohol ethoxylate is a polyoxyethylene (4 to 12) lauryl ether (C12), polyoxyethylene (10) cetyl ether (C16), polyoxyethylene (10) stearyl ether (C18), polyoxyethylene (10) oleyl ether (C18 mono-unsaturated), a polyoxyethylene (2 to 11) C12-C15 alcohol, a polyoxyethylene (3 to 9) C11-C14 alcohol, a polyoxyethylene (9) C12-C14 alcohol, a polyoxyethylene (11) C16-C18 alcohol, a polyoxyethylene (20) C12-C15 alcohol, or any combination thereof. For example, the natural or synthetic alcohol ethoxylate can be a polyoxyethylene (4 to 7) lauryl ether (C12), polyoxyethylene (10) cetyl ether (C16), a polyoxyethylene (2 to 11) C12-C15 alcohol, a polyoxyethylene (3 to 9) C11-C14 alcohol, a polyoxyethylene (9) C12-C14 alcohol, or any combination thereof. As another example, the alcohol alkoxylate can be a butyl ether polyoxyethylene/polyoxypropylene block copolymer.

In certain implementations, the emulsifier is (or includes) an alkyl polysaccharide, e.g., a C8-C11 alkylpolysaccharide or any combination thereof.

In certain implementations, the emulsifier is (or includes) a glycerol oleate, e.g., a glycerol mono-, di-, tri-oleate, or any combination thereof.

In certain implementations, the emulsifier is (or includes) a polyoxyethylene-polyoxypropylene block copolymer, e.g., a polyoxyethylene-polyoxypropylene block copolymer having a molecular weight (or relative molar mass) of from 1100 to about 11400 and 10 to 80% (ethylene oxide) EO.

In certain implementations, the emulsifier is (or includes) an alkyl phenol ethoxylate, e.g., a nonyl phenol ethoxylate, a dodecyl phenol ethoxylate, or any combination thereof. For example, the nonyl phenol ethoxylate can be a polyoxyethylene (2 to 8) nonylphenol.

In certain implementations, the emulsifier is (or includes) a polymeric surfactant, e.g., a graft copolymer, a random copolymer, or any combination thereof. For example, the graft copolymer can be a polymethacrylic acid and acrylate with polyoxyethylene chains. For example, the random copolymer can be a random copolymer having ester and ether groups.

In certain implementations, the emulsifier is (or includes) a polyethylene glycol, e.g., a polyethylene glycol having a molecular weight ("MW") (or relative molar mass) of from 200 to 8000, e.g., MW 400 PEG dioleate; or MW600 PEG dioleate.

In certain implementations, the emulsifier is (or includes) a sorbitan fatty acid ester ethoxylate, e.g., polyoxyethylene (20) sorbitan tristearate, polyoxyethylene (20) sorbitan monooleate, polyoxyethylene (5) sorbitan monooleate, polyoxyethylene (20) sorbitan trioleate, or any combination thereof. For example, the sorbitan fatty acid ester can be a sorbitan tristearate, a sorbitan triolate, or any combination thereof.

In certain implementations, the emulsifier is (or includes) an alkyl phenol ethoxylate, a mixture of an ethoxylated alcohol and a glycerol oleate, or any combination thereof.

In certain implementations, the emulsifier is (or includes) a mixture of an ethoxylated alcohol and a glycerol oleate, e.g.: a C10 to C16 alcohol ethoxylate and a glycerol oleate combination; or polyoxyethylene lauryl ether, C10 to C16 alcohol ethoxylates, and glycerol oleate; or ethoxylated alcohols having primary C5-C20 carbon chains with an average of about 2 to about 7 ethoxylation groups, and a glycerol oleate; or a polyoxyethylene (11) C16-18 alcohol.

In certain implementations, the emulsifier is (or includes) a sorbitan tristearate.

Non-limiting examples of suitable emulsifiers include AL3149 (available from Uniqema), AL3313 (available from Uniqema), PC Emuls Green (available from Petro-Canada, Calgary, AB, Canada), Lutensol™ AT11 (available from BASF), SPAN65 (available from Uniqema), and S-MAZ™65 K (available from BASF). In certain implementations, the emulsifier is Atlox 3273.

In some implementations, the weight ratio of the paraffinic oil to the emulsifier is from 10:1 to 500:1 (e.g., from 98:2 to 99.9:0.1, from 98:2 to 99.5:0.5). By way of example, the weight ratio of the paraffinic oil to the emulsifier can be 95:5, 98:2, 98.5:1.5, 99:1, 99.5:0.5.

[C] Pigment

In some implementations, the combinations can include one (or more) pigments.

The pigments can provide color to the plant being treated (e.g., turf grass) and/or in some implementations, the pigment(s) and the paraffinic oil can exhibit a greater than additive effect in promoting the health of a plant (e.g., controlling a fungal pathogen of a plant; see, for example, WO 2009/155693).

In some implementations, the pigment is a water-based pigment dispersion (or sometimes referred to as a water-dispersible pigment).

In some implementations, the pigment is an oil-based pigment dispersion (or sometimes referred to as a water-dispersible pigment).

In some implementations, the pigment is a phthalocyanine compound.

In certain implementations, the pigment is a metal-free phthalocyanine compound.

In certain implementations, the pigment is a halogenated, metal-free phthalocyanine, e.g., a polychlorinated metal-free phthalocyanine.

In certain implementations, the pigment is a metal phthalocyanine compound.

In certain implementations, the pigment is a copper phthalocyanine.

In certain implementations, the copper phthalocyanine is a non-halogenated copper phthalocyanine, e.g., a nonchlorinated copper phthalocyanine. As an example, the pigment can be Phthalocyanine Blue BN (CAS 147-14-8).

In certain implementations, the copper phthalocyanine is a halogenated copper phthalocyanine. As an example, the pigment can be Phthalocyanine Green 6G (CAS 14302-13-7). As another example, the pigment can be polychlorinated (Cu II) phthalocyanine, such as Phthalocyanine Green G (CAS 1328-45-6 and 1328-53-6).

Non-limiting examples of suitable pigments include Sunsperse™ Green 7 (Pigment Green 7 dispersed in water, available from Sun Chemical Corp. Performance Pigments Cincinnati, OH, USA), Sunsperse™ EXP 006-102 and 006-95B (Pigment Green 7 dispersed in oil, available from Sun Chemical Corp. Performance Pigments, Cincinnati, OH, USA), and Pigment Green 7 powder (available from Hercules Exports, Mumbai, India). In certain implementations, the pigment is GCDPC60.

[D] Silicone Surfactant

In some implementations, it can be advantageous to further include one (or more) silicone surfactants in combinations that further include one or more pigments.

In some implementations, the silicone surfactant is (or includes) a silicone polyether.

In certain implementations, the silicone surfactant is (or includes) a silicone polyether having a suitable alkoxy group with hydrogen end groups (H-capped), methyl end groups ($CH_3$-capped), or acetyl end groups ($COCH_3$-capped). In certain implementations, the silicone surfactant is (or includes) a trisiloxane having a suitable alkoxy group with hydrogen end groups (H-capped), methyl end groups ($CH_3$-capped), or acetyl end groups ($COCH_3$-capped).

In certain implementations, the silicone surfactant is (or includes) a silicone polyether of the formula I:

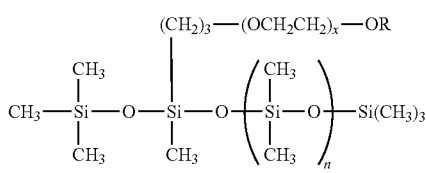

in which R is H, $CH_3$ or $COCH_3$; x is 1 to 24; and n is 0 or ≥1.

In certain implementations, the silicone surfactant is (or includes) a silicone polyether of the formula I wherein R=H; x=1 to 24; and n=0; e.g., a silicone polyether of the formula I wherein n=0; x=1-24; the average x=8-10; and R=H.

In certain implementations, the silicone surfactant is (or includes) a silicone polyether of the formula I wherein R=H; x=1 to 24; and n≥1.

In certain implementations, the silicone surfactant is (or includes) a silicone polyether of the formula I wherein R=$CH_3$; x=1 to 24; and n=0.

In certain implementations, the silicone surfactant is (or includes) a silicone polyether of the formula I wherein R=$CH_3$; x=1 to 24; and n≥1.

In certain implementations, the silicone surfactant is (or includes) a silicone polyether of the formula I wherein R=$COCH_3$; x=1 to 24; and n=0; e.g., a silicone polyether of the formula I wherein n=0; x=1-24, the average x=8-10; and R=$COCH_3$.

In certain implementations, the silicone surfactant is (or includes) a silicone polyether of the formula I wherein R=$COCH_3$; x=1 to 24; and n≥1.

In certain implementations, the silicone surfactant is (or includes) an H-capped dimethyl methyl (polyethylene oxide) silicone polymer; e.g., having a molecular weight (or relative molar mass) from 200 to 6000.

In certain implementations, the silicone surfactant is (or includes) a silicone polyether of the formula II:

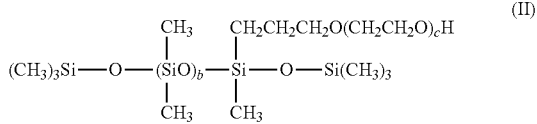

wherein c=2-16; and b=2-70. In certain implementations, the average b=44. In certain implementations, the average c=10. In certain implementations, the average b=44, and the average c=10.

In certain implementations, the silicone surfactant is (or includes) an H-capped trisiloxane, such as a silicone polyether of the formula III:

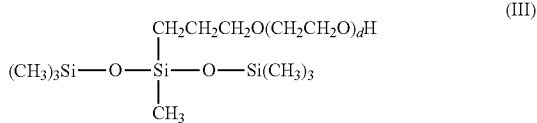

wherein d=1-24. In certain implementations, d=1-20. In certain implementations, the average d=8-10 (e.g., 8).

In certain implementations, the silicone surfactant is (or includes) a silicone copolyol, containing a hydrogen end group and one pendant polyethylene oxide group and has an average molecular weight between about 600 to about 1000 Daltons. In certain implementations, the silicone surfactant is (or includes) a trisiloxane with an ethoxylated alkyl group having a hydrogen end group (H-End); e.g., having a number of ethoxylation groups in the range of 1-20. In certain implementations, the silicone surfactant the silicone surfactant is (or includes) a methyl (propylhydroxide, ethoxylated) bis (trimethylsiloxy) silane; e.g., a dimethyl, methyl (polyethylene oxide) silicone polymer.

In some implementations, commercial preparations of the silicone surfactants may or may not contain small amounts of polyethylene glycols (PEG) or other low molecular weight polydimethyl siloxanes (PDMS).

In some implementations, the silicone surfactant further includes a polyethylene glycol.

In certain implementations, the polyethylene glycol is (or includes) a polyethylene glycol of the formula IV:

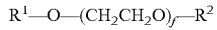

wherein $R^1$=H or $CH_2$=CH—$CH_2$ or $COCH_3$; $R^2$=H or $CH_2$=CH—$CH_2$ or $COCH_3$; and f≥1.

In certain implementations, the polyethylene glycol has a relatively low molecular weight, e.g. from 300 Daltons to 1500 Daltons. In certain implementations, the polyethylene glycol is a low molecular weight polyethylene glycol allyl ether, such as a low molecular weight polyethylene glycol mono-allyl ether having an average molecular of from about 300 to about 600 Daltons and having from 1 to 20 moles of ethylene glycol with an average ethylene oxide unit (EO) of 8 to 10.

In certain implementations, the polyethylene glycol is (or includes) a polyethylene glycol of the formula IV wherein $R^1$=$CH_2$=CH—$CH_2$, $R^2$=H, and f=1-20 with an average f=8, a polyethylene glycol of the formula IV wherein $R^1$=$CH_2$=CH—$CH_2$ or $COCH_3$, and $R^2$=$COCH_3$, a polyethylene glycol of the formula IV wherein $R^1$=$CH_2$=CH—$CH_2$, and $R^2$=H, or any combination thereof.

In certain implementations, the polyethylene glycol is (or includes) a polyethylene glycol of the formula IV wherein $R^1$=$CH_2$=CH—$CH_2$ or $COCH_3$, and $R^2$=$COCH_3$, a polyethylene glycol of the formula IV wherein $R^1$=$CH_2$=CH—$CH_2$, and $R^2$=H, or any combination thereof.

In certain implementations, the polyethylene glycol is (or includes) a polyethylene glycol of the formula IV wherein $R^1$=$CH_2$=CH—$CH_2$, $R^2$=H, and f=1-20 with an average f=8.

In certain implementations, the polyethylene glycol is (or includes) a polyethylene glycol of the formula IV wherein $R^1$=$CH_2$=CH—$CH_2$ or $COCH_3$, and $R^2$=$COCH_3$.

In certain implementations, the polyethylene glycol is (or includes) a polyethylene glycol of the formula IV wherein $R^1$=$CH_2$=CH—$CH_2$, and $R^2$=H.

Non-limiting examples of suitable polyethylene glycols may include Polyglykol A500 (available from Clariant).

In certain implementations, the silicone surfactant includes from 10 to 30 weight percent of a polyethylene glycol as described anywhere herein.

Non-limiting examples of suitable silicone surfactants may include Sylgard™ 309 (available from Dow Corning, Midland, MI, USA), Silfsurf™ A008-UP (available from Siltech Corp. Toronto, ON, Canada), Silwet L-77 (Momentive, USA), Lambent MFF 199 SW (available from Lambent Technologies Corp., Gurnee, IL, USA), and Lambent MFF 159-100 (available from Lambent Technologies Corp., Gurnee, IL, USA). In certain implementations, the silicone surfactant and polyethylene glycol is Silwet L-77.

[E] Anti-Settling Agent

The anti-settling agent can be a dispersible substance, which when introduced into a solid (dispersed phase)-liquid (continuous phase) dispersion or suspension, substantially prevents the solid portion of said dispersion or suspension from undergoing coalescence, settling (e.g., due to gravity), and/or any other process(es) that cause(s) the solid portion to become a solid mass (e.g., a solid mass that is hard and/or compacted) that cannot be re-dispersed or re-suspended. In certain implementations, the dispersible substance is a solid sub stance.

In some implementations, the anti-setting agent is (or includes) a metal oxide and/or an organically modified clay.

In some implementations, the anti-setting agent is (or includes) a metal oxide.

In certain implementations, the anti-setting agent is (or includes) a fumed metal oxide and/or a precipitated metal oxide.

In certain implementations, the anti-setting agent is (or includes) one or more of the following forms of silica: precipitated silica (e.g., an untreated, precipitated silica) or fumed silica (e.g., an untreated, fumed silica). As used herein, the term "untreated fumed silica", or the like, is used to refer to a hydrophilic fumed silica. As used herein, the term "treated fumed silica", or the like, is used to refer to a hydrophobic fumed silica.

In certain implementations, the anti-settling agent is Aerosil 200.

In some implementations, the anti-setting agent is (or includes) an organically modified clay. In certain implementations, the anti-setting agent is (or includes) one or more of the following organically modified clays: an organically modified smectite clay, an organically modified hectorite clay, an organically modified bentonite clay, an organically modified montmorillonite clay and an organically modified attapulgite clay.

In certain implementations, the organically modified clay is activated by a chemical activator.

In certain implementations, the chemical activator includes a low-molecular-weight polar organic compound, e.g., a least one compound selected from the group consisting of a low-molecular weight ketone, a low-molecular weight alcohol and propylene carbonate.

In certain implementations, the chemical activator includes water and at least one compound selected from the group consisting of a low-molecular weight ketone, a low-molecular weight alcohol and propylene carbonate.

In certain implementations, the chemical activator includes a low-molecular weight ketone; or a low-molecular weight ketone and water (such as a low molecular weight ketone and water in a weight ratio of 95/5). An example of a low-molecular weight ketone is acetone.

In certain implementations, the chemical activator includes a low-molecular weight alcohol; or a low-molecular weight alcohol and water (such as a low-molecular weight alcohol and water in a weight ratio of 95/5). Examples of low-molecular weight alcohols include methanol or ethanol.

In certain implementations, the chemical activator includes propylene carbonate; or propylene carbonate and water (such as, propylene carbonate and water in a weight ratio of 95/5).

[F] Water

In some implementations, the combinations can further include water.

In some implementations, the pigment is dispersed in water before it is added to the remaining components of the combination (typically water is 1:1 weight percent with with pigment), resulting in, e.g., the presence of 3 parts per weight of water in the combination.

In some implementations, the combinations can further include water, e.g., as a diluent, e.g., as a diluent added prior to application of the combinations to a plant (e.g., a turfgrass).

In some implementations, the combinations can further include both sources of water described above.

In some implementations the water is distilled water and/or other waters having a low mineral electrolyte content.

[G] Other Components

In some implementations, the combinations further include one or more other components that are customary additives or adjuvants for the preparation of compositions in the field of turf or field crop protection and/or components that are inert (e.g., may not materially affect the activity and/or overall performance of the combinations) and/or one or more other active components (e.g., other fungicides).

In some implementations, the combinations can further include one or more other chemical fungicides.

In certain implementations, the other chemical fungicide is a DMI fungicide (e.g., tetraconazole, tebuconazole, propioconazole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, prothioconazole, simeconazole, triadimefon, triadimenol, triticonazole, imazalil, oxpoconazole, pefurazoate, prochloraz, triflumizole, fenarimol, nuarimol, triforine, and pyrifenox). For example, the DMI fungicide can be propiconazole.

In certain implementations, the other chemical fungicide is a QoI fungicide (e.g., pyraclostrobin, azoxystrobin, fluoxastrobin, trifloxystrobin, coumoxystrobin, dimoxystrobin, enoxastrobin, famoxadone, fenamidone, fenaminostrobin, flufenoxystrobin, kresoxim-methyl, metominostrobin, orysastrobin, pyraoxystrobin picoxystrobin, pyrametastrobin, pyribencarb, and triclopyricarb).

In certain implementations, the other chemical fungicide is methyl benzimidazole carbamate ("MBC"), such as thiophanate-methyl In certain implementations, the other chemical fungicide is dicarboximide such as iprodione, vinclozolin.

In certain implementations, the other chemical fungicide is carboximide such as boscalid, flutolanil.

In some implementations, the combinations can further include one or more customary additives or adjuvants that may be present in such chemical fungicides.

In some implementations, the combinations include only combinations of the components set forth is sections [A] through [F] above.

In certain implementations, the combinations do not include one or more other components that are customary additives or adjuvants for the preparation of compositions in the field of turf or field crop protection and/or components that are inert (e.g., may not materially affect the activity and/or overall performance of the combinations) and/or one or more other active components (e.g., other chemical fungicides).

In certain implementations, the combinations are free of one or more other components that are customary additives or adjuvants for the preparation of compositions in the field of turf or field crop protection and/or components that are inert (e.g., may not materially affect the activity and/or overall performance of the combinations) and/or one or more other active components (e.g., other chemical fungicides); (e.g., the combinations contain less than 5%, less than 4%, less than 3%, less than 2%, less than 1% (w/w or w/v) of one or more other components that are customary additives or adjuvants for the preparation of compositions in the field of turf or field crop protection and/or components that are inert (e.g., may not materially affect the activity and/or overall performance of the combinations) and/or one or more other active components (e.g., other chemical fungicides)).

In some embodiments, the combinations are substantially free of one or more other components that are customary additives or adjuvants for the preparation of compositions in the field of turf or field crop protection and/or components that are inert (e.g., may not materially affect the activity and/or overall performance of the combinations) and/or one or more other active components (e.g., other chemical fungicides) (e.g., the combinations contain less than 0.5%, less than 0.2, less than 0.1, less than 0.05% (w/w or w/v), do not include a detectable amount of one or more other components that are customary additives or adjuvants for the preparation of compositions in the field of turf or field crop protection and/or components that are inert (e.g., may not materially affect the activity and/or overall performance of the combinations) and/or one or more other active components (e.g., other chemical fungicides)).

The terms free and substantially free as used with other components have the meanings provided above.

II. Non-limiting Combinations of Components

[A] In some implementations, the combinations can be in the form of a single composition (e.g., all components contained within a storage pack or a vessel suitable for applying the composition to a plant, e.g., turf grass).

In some implementations, the composition includes:
(i) one (or more) paraffinic oils, which can include any one or more of the features described in any one or more of sections [I][A][1], [I][A][2], and [I][A][3] above; and
(ii) one (or more) anti-settling agents, which can include any one or more of the features described in section [I][E] above.

In some implementations, the combination further includes (but is not limited to) one or more of the following:
(iii) one (or more) emulsifiers, which can include any one or more of the features described in any one or more of sections [I][B][1], [I][B][2], and [I][B][3] above;
(iv) one (or more) pigments which can include any one or more of the features described in section [I][C] above;
(v) one (or more) silicone surfactants, which can include any one or more of the features described in any one or more of sections [I][D][1], [I][D][2], and [I][D][3] above; and
(vi); one (or more) components described in section [I][G].

In some implementations, the composition includes (i), (ii), and (iii) above.

In some implementations, the composition includes (i), (ii), (iii), and (iv) above.

In some implementations, the composition includes (i), (ii), (iii), (iv), and (v) above.

In some implementations, the composition includes (i), (ii), (iii), (iv), (v), and (vi) above.

Concentrates

In some of the implementations described in section [II][A][1], the composition are in the form of a concentrate.

In some implementations, one or more of the following applies:

(2-a) The weight ratio of the paraffinic oil to the anti-settling agent is from 5:1 to 100:1 (e.g., from 25:1 to 35:1, e.g., 28:1, 30:1).
(2-b) the weight ratio of paraffinic oil to the pigment is from 5:1 to 100:1 (e.g., from 25:1 to 35:1, e.g., 28:1, 30:1);
(2-c) the weight ratio of paraffinic oil to the emulsifier is from 10:1 to 500:1 (e.g., from 45:1 to 55:1, e.g., 49:1, 50:1); or
(2-d) the weight ratio of pigment to the silicone surfactant is from 2:1 to 50:1 (e.g., from 3:1 to 6:1, e.g., 3.5:1);

In certain implementations, (2-a) applies; or (2-a) and (2-b) apply or (2-a), (2-b) and (2-d) apply; or (2-b), and (2-c) apply. In certain implementations, (2-d) further applies to any one of the above-listed combinations of (2-a), (2-b) and (2-c).

In some implementations, one or more of the following applies:
(2-aa) the concentrate includes from 50 to 300 parts per weight (e.g., 200-300, e.g., 260; e.g., 50-150, e.g., 100) parts per weight of the paraffinic oil;
(2-bb) the concentrate includes from 0.5 to 20 parts per weight (e.g., 6-10, e.g., 8; e.g., 2-5, e.g., 3.1) parts per weight of the anti-settling agent;
(2-cc) the concentrate includes from 1 to 10 parts per weight (e.g., 3-7, e.g., 5; e.g., 1-5, e.g., 1.9, e.g., 2) parts per weight of the emulsifier;
(2-dd) the concentrate includes from 1 to 15 parts per weight (e.g., 7-11, e.g., 9; e.g., 2-5, e.g., 3.5) parts per weight of the pigment; or
(2-ee) the concentrate includes from 0.1 to 10 parts per weight (e.g., 0.5-1, e.g., 0.8, e.g., e.g., 2-5, e.g., 3) parts per weight of the silicone surfactant.

In certain implementations, (2-aa) and (2-bb) apply; or (2-dd) and (2-ee) apply; or (2-aa), (2-bb), and (2-dd) apply; or (2-aa), (2-bb), (2-dd), and (2-ee) apply. In certain implementations, (2-cc) further applies to each of the above-listed implementations.

In some implementations, the pigment is a water-based pigment dispersion.

In some implementations, the pigment is dispersed in compatible oil, e.g., a paraffinic oil, e.g., the same paraffinic oil as is used to provide the fungicidal properties as described herein, for addition to the other components of the combinations described herein. In certain implementations, a silicone surfactant and/or emulsifier can be included, e.g., to further stabilize the pigment in the oil-based combination. For example, polychlorinated Cu (II) phthalocyanine can be dispersed in a paraffinic oil, such as N65DW (available from Petro-Canada) to provide about 18% polychlorinated CU (II) phthalocyanine (SUNSPERSE® EXP 006-102, available from Sun Chemical Corp. Performance Pigments, Cincinnati, Ohio USA) prior to mixing with the remaining components. In certain implementations, a silicone surfactant and/or emulsifier and/or anti-settling agent can be included.

In some of the implementations, the concentrate includes the components present in Civitas™ ONE and one (or more) anti-settling agents, which can include any one or more of the features described in section [I][E] above.

In some implementations, the concentrate includes:

| | |
|---|---|
| paraffinic oil | 50 to 300 parts per weight |
| emulsifier | 1 to 10 parts per weight |
| pigment | 1 to 10 parts per weight |

-continued

| | |
|---|---|
| silicone surfactant and polyethylene glycol | 0.1 to 10 parts per weight |
| anti-settling agent | 0.5 to 20 parts per weight |

In certain implementations, the concentrate includes:

| | |
|---|---|
| paraffinic oil | 100 parts per weight |
| emulsifier | 2 parts per weight |
| pigment | 3.5 parts per weight |
| silicone surfactant and polyethylene glycol | 1 parts per weight |
| anti-settling agent | 2 parts per weight |

In certain implementations, the composition includes:

| | |
|---|---|
| paraffinic oil | 85 weight percent to 95 weight percent |
| emulsifier | 1 weight percent to 2.5% weight percent |
| pigment | 2 weight percent to 3 weight percent |
| silicone surfactant and polyethylene glycol | 1 weight percent to 2 weight percent |
| anti-settling agent | 1 weight percent to 2.5 weight percent |

In certain implementations, the remaining balance of material is water when the pigment is a water-based pigment dispersion. In other implementations, the remaining balance of material is oil when the pigment is an oil-based pigment dispersion. In certain implementations, the remaining balance of material is water when the pigment is a water-based pigment dispersion; or the remaining balance of material is oil when the pigment is an oil-based pigment dispersion; and other inert materials such as biocide and/or other solvents.

In certain implementations, the composition includes:

| | |
|---|---|
| paraffinic oil | 89 weight percent |
| emulsifier | 1.8 weight percent |
| pigment | 2.5 weight percent |
| silicone surfactant and polyethylene glycol | 1.2 weight percent |
| anti-settling agent | 1.5 weight percent |

In certain implementations, the remaining balance of material is water when the pigment is a water-based pigment dispersion. In other implementations, the remaining balance of material is oil when the pigment is an oil-based pigment dispersion.

In certain implementations, the composition includes:

| | |
|---|---|
| paraffinic oil | 85 weight percent to 95 weight percent |
| emulsifier | 1 weight percent to 2.5% weight percent |
| pigment | 2 weight percent to 3 weight percent |
| silicone surfactant and polyethylene glycol | 1 weight percent to 2 weight percent |
| anti-settling agent | 1 weight percent to 2.5 weight percent |
| DMI Inhibitor | 0.1 weight percent to 1 weight percent |

In certain implementations, the remaining balance of material is water when the pigment is a water-based pigment dispersion. In other implementations, the remaining balance of material is oil when the pigment is an oil-based pigment dispersion. In certain implementations, the remaining balance of material is water when the pigment is a water-based pigment dispersion; or the remaining balance of material is oil when the pigment is an oil-based pigment dispersion; and other inert materials such as biocide and/or other solvents.

In certain implementations, the composition includes:

| | |
|---|---|
| paraffinic oil | 89 weight percent |
| emulsifier | 1.8 weight percent |
| pigment | 2.5 weight percent |
| silicone surfactant and polyethylene glycol | 1.2 weight percent |
| anti-settling agent | 1.5 weight percent |
| propioconozole | 0.53 weight percent |

In certain implementations, the remaining balance of material is water when the pigment is a water-based pigment dispersion. In other implementations, the remaining balance of material is oil when the pigment is an oil-based pigment dispersion. This composition is sometimes referred to as Civitas+propiconazole 1 pack.

In certain implementations (including each of the tabulated combinations set forth above in this section [2]), any one or more of the following can apply:

The paraffinic oil can be N65DW.
The emulsifier can be Atlox 3273.
The pigment can be GCDPC60.
The silicone surfactant and polyethylene glycol can be Silwet L-77.
The anti-settling agent can be Aerosil 200.
The paraffinic oil can be N65DW, and the emulsifier can be Atlox 3273.
The paraffinic oil can be N65DW, the emulsifier can be Atlox 3273, and the pigment can be GCDPC60.
The paraffinic oil can be N65DW, the emulsifier can be Atlox 3273, the pigment can be GCDPC60, and the silicone surfactant and polyethylene glycol can be Silwet L-77.
The paraffinic oil can be N65DW, the emulsifier can be Atlox 3273, the pigment can be GCDPC60, the silicone surfactant and polyethylene glycol can be Silwet L-77, and the anti-settling agent can be Aerosil 200.

In some of the implementations described in sections [II][A][1] and [II][A][2], the compositions and concentrates further include water, and are in diluted form. As used herein, the expression "in diluted form" means that the amount of water present is greater than the amount of water that would be present due to the inclusion of a water-based pigment dispersion. In certain implementations, the amount of water present is sufficient to form an oil-in water emulsion as described anywhere herein.

In certain implementations, weight percent ratio of the undiluted composition to water is from 1:1 to 1:100 (e.g., from 1:50, 1:30, 1:20, 1:15, 1:10). In certain implementations, the weight percent of the paraffinic oil in the diluted compositions is from 2-5 weight percent (e.g., 2.5 weight percent). In certain implementations, the composition is in the form of an oil in water emulsion as described anywhere herein.

In some implementations, the pigment is dispersed in water for addition to the other components of the combinations described herein. In certain implementations, a silicone surfactant and/or emulsifier can be included, e.g., to further stabilize the pigment in the oil/water-based combination.

For example, polychlorinated Cu (II) phthalocyanine can be dispersed in a water to provide about 40% polychlorinated CU (II) phthalocyanine (SUNSPERSE® GREEN 7, available from Sun Chemical Corp. Performance Pigments, Cincinnati, Ohio USA) prior to mixing with the remaining components. In certain implementations, a silicone surfactant and/or emulsifier can be included.

III. Application of Combinations

[A] In general, the combinations can be applied to the plant by conventional methods known in the art, e.g., spraying, misting, sprinkling, pouring, or any other suitable method.

In some implementations, the combinations include both paraffinic oil and water. It is advantageous to apply such combinations as oil-in-water (O/W) emulsions. In some implementations, an oil-in-water emulsion is prepared by a process that includes combining the paraffinic oil, water, and any other components and the paraffinic oil and applying shear or shaking vigorously (e.g., for 30 seconds) until the emulsion is obtained. In other implementations, an oil-in-water emulsion is prepared by a process that includes combining the paraffinic oil, water, and any other components at the nozzle of a spray gun. In certain implementations, agitation is maintained throughout mixing and/or application of the combinations.

Foliar Applications

In some implementations, the combinations are applied by foliar application (e.g., by applying to the aerial exterior portion of the plant, e.g., to the leaves of the plant, e.g., by spraying the plant.

In some implementations, the combination is applied to a plant (e.g., turf grass) at a rate from 1.0 oz/1000 square ft to 50 oz/1000 square ft (e.g., from 1.0 oz/1000 square ft to 40 oz/1000 square ft; from 1.0 oz/1000 square ft to 35 oz/1000 square ft; from 5.0 oz/1000 square ft to 35 oz/1000 square ft; from 5.0 oz/1000 square ft to 15 oz/1000 square ft; from 16.0 oz/1000 square ft to 35 oz/1000 square ft; from 8.5 oz/1000 square ft to 17 oz/1000 square ft; from 17.0 oz/1000 square ft to 34 oz/1000 square ft; 17.0 oz/1000 square ft).

In some implementations, the paraffinic oil is applied to a plant (e.g., turf grass) at a rate from 1.0 oz/1000 square ft to 32 oz/1000 square ft (e.g., from 4.0 oz/1000 square ft to 16 oz/1000 square ft).

In some implementations, the pigment is applied to a plant (e.g., turf grass) at a rate from 0.001 lb/1000 ft$^2$ to 0.5 lb/1000 ft$^2$.

In some implementations, the total application volume with water is from 1 gallon/1000 square ft to 50 gallons/1000 square ft (e.g., from 1 gallon/1000 square ft to 20 gallons/1000 square ft; from 1 gallon/1000 square ft to 10 gallons/1000 square ft; from 1 gallon/1000 square ft to 5 gallons/1000 square ft)

In some implementations, the paraffinic oil is used or applied to the plant (e.g., turf grass) at an interval rate of, for example, from 7 days to 90 days (e.g., from 7 days to 28 days, from 7 days to 21 days, from 7 days to 14 days, from 14 days to 21 days, from 14 days to 28 days, 7 days, 10 days, 14, days, 21 days).

In some implementations, the combinations are applied by spraying (e.g., using a medium or coarse spray (ASABE standard 572) and the minimum volume mean diameter for spinning atomizer nozzles). In certain implementations, the nozzle height is at most about four feet above ground level.

In certain implementations, the combinations are applied by spraying when the wind speed is equal to or less than 15 mph.

Non Foliar Applications

In some implementations, the combinations (e.g., compositions, e.g., fungicidal compositions) can be applied to a growing medium (e.g., soil) that is in proximity to a base and root system of the plant, in which the amount of the composition that is applied to the growing medium is sufficient to penetrate the growing medium and contact the root tissue for uptake by the plant.

As used herein, the term "growing medium" refers to any soil (of any composition) or soil-free (e.g. hydroponic) medium that is suitable for growing and cultivating a plant. The growing medium can further include any naturally occurring and/or synthetic substance(s) that are suitable for growing and cultivating a plant.

In certain implementations, the growing medium (e.g., soil) can include any surface of the growing medium that is from 0 inches to six feet (e.g., 0 inches to five feet, 0 inches to four feet, 0 inches to three feet, 0 inches to two feet, 0 inches to 12 inches, 0 inches to six inches, 0 inches to one inch, 0 inches to 0.5 inch) from the base of the plant and any growing medium that is from 0 inches to 24 inches beneath said surface of the growing medium. In other implementations, the length of the surface of the growing medium can be determined on the basis of the height of the plant, e.g., can correspond to the shade radius of the plant (i.e., the distance around the plant that is shaded during daylight hours due to the height of the plant).

In some implementations, applying is carried out by soil drenching (e.g., by pouring the combinations described herein as a bolus on the surface of the growing medium or soaking a plant tray in the combinations described herein, e.g., root bathing).

In some implementations, applying is carried out by drip irrigation.

In some implementations, applying is carried out by soil injection.

In some implementations (e.g., when the plant is a crop plant, e.g., wheat, barley, soybean, tomatoes, potatoes, or corn, or any combination thereof; e.g., wheat or tomatoes), the combinations (e.g., compositions, e.g., fungicidal compositions) further include from 50 to 99 parts per weight of water (e.g., the composition can be an oil-in-water emulsion). In certain implementations, the combinations (e.g., compositions, e.g., fungicidal compositions) can be applied at a rate of from 100 gal/acre to 800 gal/acre (e.g., 200 gal/acre to 400 gal/acre). In certain implementations, the combinations (e.g., compositions, e.g., fungicidal compositions) further includes from 50 to 99 parts per weight of water (e.g., the composition can be an oil-in-water emulsion), and the combinations (e.g., compositions, e.g., fungicidal compositions) can be applied at a rate of from 100 gal/acre to 800 gal/acre (e.g., 200 gal/acre to 400 gal/acre). In certain implementations, the oil can be applied at a rate of from 1 gal/acre to 20 gal/acre.

In some implementations (e.g., when the plant is a tree (e.g., a maple tree, a citrus tree, an apple tree, a pear tree, an oak tree, an ash tree, a pine tree, or a spruce tree, or any combination thereof; e.g., a maple tree), the combinations (e.g., compositions, e.g., fungicidal compositions) further includes from 5 to 99 parts per weight of water (e.g., the composition can be an oil-in-water emulsion). In certain implementations, the oil can be added at a rate of from 1 oz to 2 gallons of the combinations (e.g., compositions, e.g., fungicidal compositions) per inch of tree diameter. In certain implementations, the composition further includes from 5 to 99 parts per weight of water (e.g., the composition can be an oil-in-water emulsion), and the oil can be added at a rate of from 1 oz to 2 gallons of the combinations (e.g., compositions, e.g., fungicidal compositions) per inch of tree diameter.

In some implementations, the combinations (e.g., compositions, e.g., fungicidal compositions) can be applied over a time period of at least ten seconds (e.g., at least five seconds, at least two seconds).

Additional Features(s) to Supplemental Foliar or Non Foliar Applications

In the above-described implementations, application of any one (or more) combinations can be repeated one or more times.

In some implementations, the application methods described above can further include applying one or more conventional chemical fungicides to the plant (e.g., the one or more conventional chemical fungicides can be applied to an aerial portion of the plant), e.g., when disease pressure is high, e.g., when disease pressure is high and/or when the target disease is one or more of *Fusarium* patch, grey leaf spot, large patch of *Zoysia*, snow mold (grey or pink), spring dead spot, summer patch, brown patch, crown rust, or dollar spot.

In some implementations, the application methods described above can further include adding water (e.g., to the growing medium) after the composition has been applied. In certain implementations, the methods can further include "watering in" the combinations (e.g., compositions, e.g., fungicidal compositions). For example, the combinations (e.g., compositions, e.g., fungicidal compositions) can be applied first to a growing medium (e.g., soil) and then watered in with, e.g., 0.5 to 2 inches of water.

In some implementations, the combinations are applied to golf courses (e.g., golf course fairways, tee boxes, and/or putting greens).

[B] In some implementations, the pest is any one or more of the following (or any combination thereof): fungus or fungi, one or more bacteria, one or more viruses, one or more spiders, one or more ticks, one or more mites, one or more nematodes, one or more gastropods, and one or more insects.

In certain implementations, the pest is any one or more of the following (or any combination thereof): fungus or fungi, one or more ticks, one or more mites, one or more gastropods, and one or more insects.

In certain implementations, the pest is a fungus or fungi.

In certain implementations, the pest is any one or more of the following (or any combination thereof): one or more bacteria, one or more viruses, one or more spiders, one or more ticks, one or more mites, one or more nematodes, one or more gastropods, and one or more insects.

In certain implementations, plant pests include those that are at various stages of development, for example, egg, larva, nymph or adult stage.

In certain implementations, plant pests include creeping, crawling, hopping, flying, burrowing or subterranean insects.

In certain implementations, the pest is any one or more of the following (or any combination thereof): *Colletotrichum cereale, Rhizoctonia solani*, the fungus that causes crown rust, *Sclerotinia homoeocarpa, Microdochium nivale, Pyricularia grisea, Drechslera* spp., *Biopolaris* spp., *Leptosphaeria korrae, Erysiphe graminis, Laetisaria fuciformis, Typhula ishikariensis, Typhula incarnate, Microdochium nivale*, the fungus that causes southern blight, *Ophiosphaerella korrae, Magnaporthe poae, Pythium* spp., *Limonomyces roseipellis, Rhizoctonia cerealis, Sclerophthora macrospora, Ustilago striiformi, Gaeumannomyces graminis* var. *avenae, Puccinia* spp., *Ascochyta* spp., a weevil, a cutworm, a webworm, an armyworm, a pillbug, a grub, an aphid, a chinch bug, a chafer, a beetle, a grasshopper, a scale, a mealybug, a cranefly, an earwig, a slug, an ant, a flea, a tick, a mite, a nematode, a ground pearl, a billbug and a mole cricket.

In certain implementations, the pest is any one or more of the following (or any combination thereof): *Colletotrichum cereale, Rhizoctonia solani*, the fungus that causes crown rust, *Sclerotinia homoeocarpa, Microdochium nivale, Pyricularia grisea, Drechslera* spp., *Biopolaris* spp., *Leptosphaeria korrae, Erysiphe graminis, Laetisaria fuciformis, Typhula ishikariensis, Typhula incarnate, Microdochium nivale*, the fungus that causes southern blight, *Ophiosphaerella korrae, Magnaporthe poae, Pythium* spp., *Limonomyces roseipellis, Rhizoctonia cerealis, Sclerophthora macrospora, Ustilago striiformi, Gaeumannomyces graminis* var. *avenae, Puccinia* spp., or *Ascochyta* spp.

In certain implementations, the pest is any one or more of the following (or any combination thereof): a weevil, a cutworm, a webworm, an armyworm, a pillbug, a grub, an aphid, a chinch bug, a chafer, a beetle, a grasshopper, a scale, a mealybug, a cranefly, an earwig, a slug, an ant, a flea, a tick, a mite, a nematode, a ground pearl, a billbug and a mole cricket.

In certain implementations, the pest is any one or more of the following (or any combination thereof): bluegrass weevils, cutworms, sod webworms, pillbugs, grubs, aphids, mites, chinch bugs, chafers, beetles, grasshoppers, scales, craneflies, earwigs, slugs, ants, fleas, mealybugs and ticks.

In certain implementations, the pest is any one or more of the following (or any combination thereof): annual blue grass weevils, banks grass mites, mealybugs, mites, cutworms, sod webworms and fall armyworms.

In certain implementations, the pest is any one or more of the following (or any combination thereof): an annual blue grass weevil (*Listronotus maculicollis*), a black cutworm (*Agrotis ipsilon*), a granulate cutworm (*Feltia subterranea*), a variegated cutworm (*Peridroma saucia*), a bronzed cutworm (*Nephelodes minians*), a tropical sod webworm (*Herpetogramma phaeopteralis*), a bluegrass webworm (*Parapediasia teterrella*), a larger sod webworm (*Pediasia trisecta*), a true armyworm (*Pseudaletia unipuncta*), a fall armyworm (*Spodoptera frugiperda*), a white grub of a Green June Beetle (*Cotinis nitida*), a white grub of a Japanese Beetle (*Popillia japonica*), a white grub of an Asiatic Garden Beetle (*Maladera castanea*), a white grub of an oriental beetle (*Anomala orientalis*), a white grub of a northern masked chafer (*Cyclocephala borealis*), a white grub of an European chafer (*Rhizotrogus majalis*), a white grub of a May/June beetle (*Phyllophaga* spp.), a hairy chinch bug, a southern chinch bug (*Blissus insularis*), a Rhodesgrass mealybug (*Antonina graminis*), a Bermudagrass scale (*Odonaspis ruthae*), a white armored scale (*Duplachionaspis divergens*), a hunting billbug (*Sphenophorus venatus vestitus*), a mole cricket (*Scapteriscus* spp.), a bermudagrass mite (*Eriophyes cynodoniensis*), a Banks grass mite (*Oligonychus pratensis*), a clover mite (*Bryobia praetiosa*), a brown wheat mite (*Petrobia latens*), a Green June Beetle (*Cotinis nitida*), a Japanese Beetle (*Popillia japonica*), an Asiatic Garden Beetle (*Maladera castanea*), an oriental beetle (*Anomala orientalis*), a northern masked chafer (*Cyclocephala borealis*), a European chafer (*Rhizotrogus majalis*), a May or June beetle (*Phyllophaga* spp.), a hunting billbug (*Sphenophorus venatus vestitus*), a mole cricket (*Scapteriscus* spp.), a clover mite (*Bryobia praetiosa*) and a brown wheat mite (*Petrobia latens*).

In certain implementations, the pest is any one or more of the following (or any combination thereof): a fungus that causes anthracnose, a fungus that causes brown patch, a fungus that causes dollar spot, a fungus that causes gray leaf spot, a fungus that causes crown rust, a fungus that causes *Fusarium* patch, a fungus that causes large patch of *Zoysia*, a fungus that causes leaf spot, a fungus that causes necrotic ring, a fungus that causes powdery mildew, a fungus that causes red thread, a fungus that causes pink snow mold, a fungus that causes grey snow mold, a fungus that causes southern blight, a fungus that causes spring dead spot, a fungus that causes summer patch, a fungus that causes yellow turf, a fungus that causes *Pythium* foliar blight, a fungus that causes pink patch, a fungus that causes leaf blight, a fungus that causes yellow patch, a fungus that causes downey mildew, a fungus that causes *Pythium* blight, a fungus that causes rusts, a fungus that causes stripe smut, a fungus that causes summer leaf spot, a fungus that causes take-all patch and a fungus that causes microdochium patch.

In certain implementations, the pest is any one or more of the following (or any combination thereof): a fungus that causes anthracnose, a fungus that causes brown patch, a fungus that causes crown rust, a fungus that causes dollar spot, a fungus that causes *Fusarium* patch, a fungus that causes gray leaf spot, a fungus that causes large patch of *Zoysia*, a fungus that causes leaf spot, a fungus that causes melting-out, a fungus that causes necrotic ring, a fungus that causes powdery mildew, a fungus that causes red thread, a fungus that causes grey snow mold, a fungus that causes pink snow mold, a fungus that causes southern blight, a fungus that causes spring dead spot and a fungus that causes summer patch.

[C]

In some implementations, the plant is monocotyledonous. In certain implementations, the monocotyledonous plant is of the order Poaceae. In certain implementations, the plant is of the genus *Triticum, Secale, Hordeum, Oryza, Zea,* or *Elymus*.

In some implementations, the plant is dicotyledonous. In certain implementations, the plant is of the order Fabaceae. In certain implementations, the plant is of the species *Glycine max*.

In some implementations, the plant is a turf grass.

In certain implementations, the turf grass is one or more of: bentgrass, fine-leaf fescue, *Poa annua*, tall fescue, seashore *Paspalum*, Bermudagrass, zoysiagrass, bahiagrass, centipedegrass, or St. Augustinegrass.

In certain implementations, the turf grass is one or more of: bentgrass, bluegrass, ryegrass, fescue, bermudagrass, bahiagrass, *Zoysia*, beachgrass, wheatgrass or carpetgrass.

In certain implementations, the turf grass is one or more of: creeping bentgrass, colonial bentgrass, perennial ryegrass, annual ryegrass, Kentucky bluegrass, common bermudagrass, hybrid bermudagrass, annual bluegrass, seashore *Paspalum*, St. Augustinegrass, tall fescue, bahiagrass, zoysiagrass, centipedegrass, rough stalk bluegrass, buffalo grass, blue grama, or annual bentgrass.

In certain implementations, the turf grass is one or more of: creeping bentgrass or annual bluegrass.

In some implementations, the plant is a "crop plant."

In certain implementations, the crop plant is sugar cane, wheat, rice, corn (maize), potatoes, sugar beets, barley, sweet potatoes, cassava, soybeans, tomatoes, legumes (beans and peas).

In certain implementations, the crop plant is wheat, barley, oat, soybeans, and corn.

In certain implementations, the crop plant is wheat, barley, and/or oat.

In certain implementations, the crop plant is soybeans.

In certain implementations, the crop plant is corn.

In some implementations, the plant is a tree (e.g., a maple tree, a citrus tree, an apple tree, a pear tree, an oak tree, an ash tree, a pine tree, or a spruce tree, or any combination thereof; e.g., a maple tree).

[D]

In some implementations, the plant disease may be caused by, for example, a fungal pathogen, e.g., *Sclerotinia homoeocarpa, Colletotrichum cereale, Rhizoctonia solani, Microdochium nivale, Pyricularia grisea, Rhizoctonia solani, Drechslera* spp., *Biopolaris* spp, *Leptosphaeria korrae, Erysiphe graminis, Laetisaria fuciformis, Typhula ishikariensis, Typhula incarnate, Ophiosphaerella korrae, Magnaporthe poae*, or a combination thereof. In certain implementations, the fungal pathogen is *Sclerotinia homoeocarpa*.

In some implementations, the turfgrass disease may be, for example, dollar spot, anthracnose, brown patch, crown rust, *Fusarium* patch, gray leaf spot, large patch of *Zoysia*, leaf spot/melting-out, necrotic ring, powdery mildew, red thread, grey snow mold, pink snow mold, southern blight, spring dead spot, summer patch, or a combination thereof.

In certain implementations, the plant disease may be, for example, at least one plant disease selected from the group consisting of anthracnose, brown patch, crown rust, dollar spot, *Fusarium* patch, gray leaf spot, large patch of *Zoysia*, leaf spot, melting-out, necrotic ring, powdery mildew, red thread, grey snow mold, pink snow mold, southern blight, spring dead spot, summer patch, yellow patch, downy mildew/yellow tuft, stripe smut, take-all patch, microdochium patch, rusts, yellow turf, leaf blight, summer leaf spot, *Pythium* foliar blight disease, pink patch and *Pythium* blight.

In certain implementations, the plant disease may be, for example, at least one plant disease selected from the group consisting of anthracnose, brown patch, crown rust, dollar spot, *Fusarium* patch, gray leaf spot, large patch of *Zoysia*, leaf spot, melting-out, necrotic ring, powdery mildew, red thread, grey snow mold, pink snow mold, southern blight, spring dead spot and summer patch.

In certain implementations, the fungal pathogen is a fungus that blights leaf tissue in a turfgrass.

In certain implementations, the fungal pathogen is a fungus that causes dollar spot in a turf grass.

In some implementations, the plant is monocotyledonous. In certain implementations, the monocotyledonous plant is of the order Poaceae. In certain implementations, the plant is of the genus *Triticum, Secale, Hordeum, Oryza, Zea,* or *Elymus*. The fungal pathogen may be of the order Pucciniales. The fungal pathogen may be of the genus *Puccinia*. The fungal pathogen may be of the species *Puccinia graminis, Puccinia triticina*, or *Puccinia sriiformis*. The fungal pathogen can also be *Bipolaris sorokiniana* or *Fusarium graminearum*.

In some implementations, the plant is dicotyledonous. In certain implementations, the plant is of the order Fabaceae. In certain implementations, the plant is of the species *Glycine max*. The fungal pathogen can be of the genus *Phakopsora*. The fungal pathogen can be *Phakopsora pachyrhizi* and *Phakopsora meibomiae*. The plant can be of the genus *Gossypium*. The fungal pathogen can be *Phakopsora gossypii*.

In some implementations, the fungal pathogen may be, for example, *Gymnosporangium jumperi-virginianae, Cronartium ribicola, Hemileia vastatrix Puccinia graminis, Puccinia coronata, Puccinia hemerocallidis, Puccinia persistens* subsp. *Triticina, Puccinia sriiformis, Puccinia triticina, Phakopsora meibomiae, Phakopsora pachyrhizi, Uromyces phaseoli, Uromyces appendeculatus, Fusarium

*graminearum, Bipolaris sorokiniana*, or a combination thereof. In alternative implementations, the fungal disease may be, for example: cedar-apple rust, which attacks, for example, apple and pear and hawthorn); white pine blister rust, which attacks, for example, white pines and currants; coffee rust, which attacks, for example, the coffee plant; wheat stem rust, which attacks, for example, Kentucky bluegrass, barley, and wheat; crown rust, which attacks, for example, oats and ryegrass; soybean rust, which attacks, for example, soybean and various legumes; leaf rust, which attacks, for example, wheat; bean rust which attacks, for example, bean; Daylily rust, which attacks, for example, Daylily; wheat rust in grains, also known as "brown" or "red rust"); "yellow" or "stripe rust", which attacks, for example, wheat; spot blotch, which attacks, for example, wheat; and *Fusarium* head blight, which attacks, for example, wheat.

In alternative implementations, the fungal pathogen may be, for example, a fungus that blights leaf tissue in a crop plant. In selected implementations, the crop plant pathogen is the fungal pathogen *Gymnosporangium juniperi-virginianae*, and the disease may be, for example, cedar-apple rust. In alternative implementations, the crop plant pathogen is the fungal pathogen *Cronartium ribicola*, and the disease may be, for example, white pine blister rust. In selected implementations, the crop plant pathogen is the fungal pathogen, and the disease may be, for example, coffee rust. In alternative implementations, the crop plant pathogen is the fungal pathogen *Puccinia graminis*, and the disease may be, for example, wheat stem rust. In selected implementations, the crop plant pathogen is the fungal pathogen *Puccinia coronata*, and the disease may be, for example, crown rust. In alternative implementations, the crop plant pathogen is the fungal pathogen *Phakopsora meibomiae* or *Phakospora pachyrhizi*, and the disease may be, for example, soybean rust. In alternative implementations, the crop plant pathogen is the fungal pathogen *Uromyces phaseoli*, and the disease may be, for example, bean rust. In selected implementations, the crop plant pathogen is the fungal pathogen *Puccinia hemerocallidis*, and the disease may be, for example, Daylily rust. In alternative implementations, the crop plant pathogen is the fungal pathogen *Puccinia persistens* subsp. *triticina*, and the disease may be, for example, brown rust or red rust. In selected implementations, the crop plant pathogen is the fungal pathogen *Puccinia sriiformis*, and the disease may be, for example, yellow rust or strip rust. In alternative implementations, the crop plant pathogen is the fungal pathogen *Uromyces appendeculatus*, and the disease may be, for example, bean rust. In selected implementations, the crop plant pathogen is the fungal pathogen *Puccinia triticina*, and the disease may be, for example, leaf rust. In alternative implementations, the crop plant fungal pathogen is *Fusarium graminearum* and the disease may be, for example, *Fusarium* head blight. In selected implementations, the crop plant pathogen is the fungal pathogen *Bipolaris sorokiniana*, and the disease may be, for example, spot blotch.

In certain implementations, the plant pest is *Pythium* spp., and the disease is *Pythium* foliar blight and/or *Pythium* blight.

In certain implementations, the plant pest is *Limonomyces roseipellis*, and the disease is pink patch.

In certain implementations, the plant pest is *Rhizoctonia cerealis*, and the disease is yellow patch.

In certain implementations, the plant pest is *Sclerophthora macrospora*, and the disease is downy mildew/yellow tuft.

In certain implementations, the plant pest is *Ustilago striiformis*, and the disease is stripe smut.

In certain implementations, the plant pest is *Gaeumannomyces graminis* var. *avenae*, and the disease is take-all patch.

In certain implementations, the plant pest is *Microdochium nivale*, and the disease is microdochium patch.

In certain implementations, the plant pest is *Puccinia* spp., and the disease is rust.

In certain implementations, the disease is yellow turf.

In certain implementations, the disease is leaf blight.

In certain implementations, the plant pest is *Ascochyta* spp., and the disease is

*Ascochyta* leaf blight.

In certain implementations, the disease is summer leaf spot.

In some implementations, the plant disease is maple tar spot.

In some implementations, the plant disease is Asian Citrus Psyllid (ACP)/Huanglongbing (HLB), or Citrus cancer. In other implementations, the plant disease is one or more of those listed in www.cdfa.ca.gov/plant/PDEP/target_pests.html;

In some implementations, the plant disease is bacterial spot and/or bacterial speck.

[E] In some implementations, the combinations described herein can be prepared using the methods described in, for example, WO 2009/155693.

In some implementations, methods for making the combinations described herein include:
 (i) mixing a paraffinic oil, an emulsifier, a pigment, a silicone surfactant, and an anti-settling agent to form a first mixture; and
 (ii) homogenizing the first mixture formed in step (i) to form a second mixture.

In some implementations, methods for making the combinations described herein include:
 (i) mixing a paraffinic oil, an emulsifier, a silicone surfactant, and an anti-settling agent to form a first mixture (e.g., an emulsion); and
 (ii) introducing a pigment (e.g., a water-based pigment dispersion) into the first mixture using a shear stress (e.g., homogenization, mechanical shearing, grinding/milling) to form a second mixture (e.g., a dispersed emulsion).

In some implementations, methods for making the combinations described herein include:
 (i) mixing a paraffinic oil, an emulsifier, a pigment, a silicone surfactant, and an anti-settling agent to form a first mixture; and
 (ii) applying a shear stress (e.g., homogenization, mechanical shearing, grinding/milling) to the first mixture formed in step (i) to form a second mixture.

In some implementations, methods for making the combinations described herein include:
 (i) providing a first mixture that comprises one or more of the following: a paraffinic oil, an emulsifier, a silicone surfactant, and an anti-settling agent; and
 (ii) applying a shear stress to the first mixture provided in step (i) to form a second mixture.

In certain implementations, the pigment is a water-dispersible pigment.

In certain implementations, the first mixture is an emulsion.

In certain implementations, the components that are present in the first mixture can all be added at once and mixed;

or some of the components can be added and mixed followed by the addition and mixing in of one or more other components.

In certain implementations, one or components can be added prior to and during the applying the shear stress to the first mixture (e.g., the methods can further include adding the pigment prior to and/or during the applying the shear stress to the first mixture (e.g., to achieve a pigment (e.g., a water dispersible pigment) particle size of not more than 100 micrometers (e.g., from 50% to 99%, 50% to 90%, 50% to 80%, 90% to 99% of the pigment (e.g., a water dispersible pigment) has a particle size of not more than 100 micrometers).

For example:

The first mixture can include a paraffinic oil, an emulsifier, and an anti-settling agent.

The method can further include adding a silicone surfactant and a pigment prior to and/or during the applying the shear stress to the first mixture.

The first mixture can include a paraffinic oil, an emulsifier, and an anti-settling agent, and the method can further include adding a silicone surfactant and a pigment prior to and/or during the applying the shear stress to the first mixture.

As another example:

The first mixture can include: a paraffinic oil, an emulsifier, a silicone surfactant, and an anti-settling agent.

The providing step can include (a) mixing together the paraffinic oil, the emulsifier, and the silicone surfactant; and (b) adding the anti-settling agent to the paraffinic oil/emulsifier/silicone surfactant mixture formed in (a).

The first mixture can include: a paraffinic oil, an emulsifier, a silicone surfactant, and an anti-settling agent, and the providing step can include (a) mixing together the paraffinic oil, the emulsifier, and the silicone surfactant; and (b) adding the anti-settling agent to the paraffinic oil/emulsifier/silicone surfactant mixture formed in (a).

As a further example:

The first mixture can include: a paraffinic oil and an emulsifier.

The method can further include adding the pigment and the silicone surfactant prior to and/or during the applying of the shear stress to the first mixture.

The first mixture can include: a paraffinic oil and an emulsifier, and the method can further include adding the pigment and the silicone surfactant prior to and/or during the applying of the shear stress to the first mixture.

In certain implementations, the second mixture is a dispersed emulsion.

In certain implementations, applying the shear stress to the first mixture can include one or more of the following: homogenizing the first mixture; mechanical shearing of the first mixture; or grinding and/or milling the first mixture.

In certain implementations, step (ii) in the methods described above includes dual-feed operation of a Sonolator homogenizer (Sonic Corp.). See, e.g., www.sonicmixing.com.

In certain implementations, step (ii) in the methods described above includes rotor-stator type, or colloid mill, or single-feed high pressure homogenizer (such as APV 2000, Microfluidizer, or Sonolator). In general, these methods include pre-mixing of the oil and pigment that are then processed through the homogenizer. In some instances, the process includes dual-feed operation where oil and pigment are not pre-mixed but rather they are fed to the homogenizer separately and mix instantly in the homogenizing valve.

The methods can further include adding an anti-settling agent to the second mixture formed in (ii).

In certain implementations, the methods further include mixing the second mixture with water for a time sufficient to form an oil-in-water emulsion.

Any one or more of the features described in [III][A] through [III][D] can be combined.

The features described in section III above can be combined with any one or more of the features described in sections I and II above.

Various implementations and examples of the combinations are described herein. These embodiments and examples are illustrative, and not limiting.

EXAMPLES

Example 1: Effect of Anti-Settling Agent

Figure 1B:
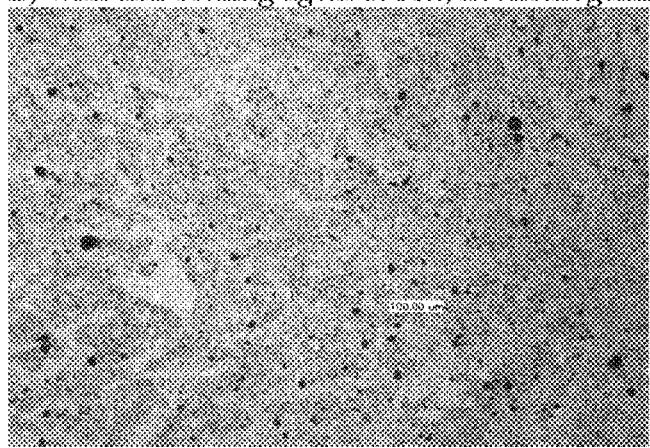
FIG. 1B is an image of a combination that includes an anti-settling agent at 50×, not homogenized.
Figure 1C:
FIG. 1C is an image of a combination that includes an anti-settling agent at 50×, homogenized.

Referring to FIG. 1, the image on the top (a) shows a mixture of the pigment mixed into the oil. There is immediate aggregation and dropout of solid material. It was not possible to re-disperse the material through agitation, and there was also no benefit to homogenization.

Referring to FIG. 1, the image on the middle (b) shows the effect of the addition of the anti-settling agent in 1-Pack, which was found to reduce the aggregation and dropout of pigment when added to the oil. Over time (weeks, months) some phase separation that occurs; however, this can be reversed through agitation.

Referring to FIG. 1, the image on the bottom (c) shows the effect of the addition of a high shear processing step to disperse the anti-settling agent into the oil. A high shear processing step (using dual-feed operation of Sonolator, Sonic Corp.) further reduces particle size of the pigment and improves the stability.

Example 2

The study below shows dollar spot & brown patch control when treated with Civitas 1-Pack (or Civitas ONE), Civitas+ propiconazole 1 pack and compared to Civitas (2-Pack) standard and in combination with chemical fungicides.

The trial was conducted on the 'research tee'. Treatments were applied using 8004 calibrated to deliver 88 gallons per acre. All application days where rain-free and all treatments were applied to a dry canopy generally mid-morning.

The study was maintained as a typical golf course tee. The site has a history of severe brown patch (*Rhizoctonia solani*) and dollar spot activity. The turf consisted of 'Princeville' creeping bentgrass that was mowed at the height of 0.450 and three times per week. The study area received 1.5 lb N per 1000 ft$^2$ from 31-0-0 (IBDU) in winter before the trial.

Dollar spot (*Sclerotinia homoeocarpa*) was rated on a percent (%) blighted scale from 0 to 100 where 100=total plot area blighted. Percent plot area blighted by brown patch (*Rhizoctonia solani*) was rated on a percent (%) blighted scale from 0 to 100 where 100=total plot area blighted. Phytotoxicity was rated on a 0 to 5 scale where 2=maximum acceptable from a fungicide application and 5=brown turf. Turfgrass quality was rated on a 0 to 10 scale where 10=optimal turfgrass. In late July a natural population of black cutworms (*Agrotis ipsilon* (Hufnagel) the number of visible feeding centers per plot were counted. Data were subjected to an ANOVA using ARM and the Tukeys multiple mean comparison test.

Dollar spot data are in table 1. Brown patch data are shown in table 2. Civitas+Harmonizer (aka Civitas 2 Pack)

and Civitas 1 Pack and Civitas+propiconazole 1 Pack (with anti-settling agent) performed very well and had significantly disease when compared to the untreated control. The largest impact on turfgrass quality was dollar spot and brown patch severity. Generally, treatments providing the highest level of dollar spot had the highest quality.

In late July a natural population of black cutworms (*Agrotis ipsilon* (Hufnagel) invaded the plots. There was an agronomically important reduction in black cutworms in plots receiving Civitas+Harmonizer and Civitas 1 Pack.

The data demonstrate that Civitas 1 Pack provided good control in dollar spot and brown patch control.

TABLE 1

Percent plot area blighted by dollar spot

| | | | Rating Date | | | | | | |
|---|---|---|---|---|---|---|---|---|---|
| | | | 17-Jun | 26-Jun | 1-Jul | 8-Jul | 17-Jul | 24-Jul | 30-Jul | 10-Aug |
| | | | | | | Rating Type | | | |
| Trt | Treatment | oz/1000 ft2 | Percent plot area blighted with dollar spot (0-100) | | | | | | | |
| 1 | Civitas Harmonizer | 16 1 | 0 b | 0 b | 0 a | 0.5 b | 1.8 a | 2.5 ab | 2.5 c | 3 b |
| 2 | Civitas 1 pack | 17 | 0 b | 0 b | 0.38 a | 1.5 ab | 1 a | 2 ab | 2 c | 2.3 b |
| 3 | Civitas 1 Pack Banner MAXX Daconil Ultrex | 17 0.5 1.5 | 0 b | 0 b | 0 a | 0 b | 0 a | 1.3 ab | 0.5 c | 0.5 b |
| 4 | Civitas + propiconazle 1 pack | 17 | 0.00 b | 0.00 b | 0.25 a | 0.0 b | 0.3 a | 1.0 ab | 0.63 c | 0.8 b |
| 5 | Untreated | | 0.5 ab | 2 a | 9 a | 5.5 a | 8.5 a | 8.3 ab | 16.5 a | 13 a |
| Treatment Prob(F) | | | 0.0033 | 0.0039 | 0.1446 | 0.0024 | 0.0478 | 0.0214 | 0.0001 | 0.0001 |

*Treatments were applied on 27 May (A), 8 (B) and 23 (C) June, and 3 (D) and 23 (E) July 2010.
**Means followed by same letter do not significantly differ (P = .05, Tukey's HSD)
***Dollar spot (*Sclerotinia homoeocarpa*) was rated on a percent (%) blighted scale from 0 to 100 where 100 = total plot area blighted

TABLE 2

Percent plot area blighted by brown patch

| | | | Rating Date | | | | | |
|---|---|---|---|---|---|---|---|---|
| | | | 17-Jun | 26-Jun | 1-Jul | 8-Jul | 17-Jul | 10-Aug |
| | | | | | | Rating Type | | |
| Trt | Treatment | oz/1000 ft2 | Percent plot area blighted with brown patch (0-100) | | | | | |
| 1 | Civitas Harmonizer | 16 1 | 0 b | 0 b | 0 a | 0.5 b | 3 b | 2 b |
| 2 | Civitas 1 pack | 17 | 0 a | 0 b | 0 b | 4 ab | 2 b | 2 b |
| 3 | Civitas 1 Pack Banner MAXX Daconil Ultrex | 17 0.5 1.5 | 0 a | 0 b | 0 b | 0 b | 0 b | 0 b |
| 4 | Civitas + propiconazle 1 pack | 17 | 0 a | 0 b | 0 b | 0 b | 0 b | 0 b |
| 5 | Untreated | | 0 a | 7.5 a | 10 a | 16 a | 20 a | 24 a |
| Treatment Prob(F) | | | 1 | 0.0186 | 0.0053 | 0.0101 | 0.0067 | 0.0071 |

*Treatments were applied on 27 May (A), 8 (B) and 23 (C) June, and 3 (D) and 23 (E) July 2010.
**Means followed by same letter do not significantly differ (P = .05, Tukey's HSD)
***Brown patch was rated on a percent (%) blighted scale from 0 to 100 where 100 = total plot area blighted.

TABLE 3

Overall turfgrass quality

| | | | Rating Date | | | | | |
|---|---|---|---|---|---|---|---|---|
| | | | 7-Jun | 26-Jun | 1-Jul | 8-Jul | 17-Jul | 24-Jul |
| | | | | | | Rating Type | | |
| Trt | Treatment | oz/1000 ft2 | Turfgrass quality (0-10) | | | | | |
| 1 | Civitas Harmonizer | 16 1 | 8.38 a | 9 a | 9 a | 7.9 ab | 6.6 a | 7 a |
| 2 | Civitas 1 pack | 17 | 8.75 a | 8.8 a | 8.75 a | 8 ab | 6.8 a | 6 a |
| 3 | Civitas 1 pack Banner MAXX Daconil Ultrex | 17 0.5 1.5 | 8.25 a | 7.75 ab | 8.23 ab | 6.8 ab | 5 a | 8 a |

TABLE 3-continued

Overall turfgrass quality

| | | | Rating Date | | | | |
|---|---|---|---|---|---|---|---|
| | | | 7-Jun | 26-Jun | 1-Jul | 8-Jul | 17-Jul | 24-Jul |
| | | | | | Rating Type | | |
| Trt | Treatment | oz/1000 ft2 | | | Turfgrass quality (0-10) | | |
| 4 | (Civitas + propiconazole) 1 pack | 17 | 8.5 a | 8.25 ab | 8.75 a | 7.1 ab | 6.3 a | 8 a |
| 4 | Untreated | | 7.75 a | 7.25 b | 7.13 b | 5.8 b | 5.5 a | 5 a |
| | Treatment Prob(F) | | 0.0215 | 0.0001 | 0.0006 | 0.0029 | 0.2167 | 0.0677 |

TABLE 4

Number of cutworm feeding centers per 25 feet square and phytotoxicity as impacted

| | | | Rating Date | |
|---|---|---|---|---|
| | | | 8-Jun phyto (0-5)** | 24-Jul # cutworm |
| Trt | Treatment | oz/1000 ft2 | | |
| 1 | Civitas | 16 | 0 | 27.5 |
| | Harmonizer | 1 | | |
| 2 | Civitas 1Pack | 17 | 0 | 40.5 |
| 3 | Civitas 1 Pack | 17 | 0 | 17.3 |
| | Banner MAXX | 0.5 | | |
| | Daconil Ultrex | 1.5 | | |
| 4 | (Civitas + propiconazole) 1pack | 17 | 0 | 20.3 |
| 5 | Untreated | | 0 | 56.5 |
| | Treatment Prob(F) | | 0.0001 | 0.2557 |

*Treatments were applied on 27 May (A), 8 (B) and 23 (C) June, and 3 (D) and 23 (E) July 2010.
**Phytotoxicity was rated on a 0 to 5 scale where 2 = maximum acceptable from a fungicide application and 5 = brown turf.
Number of cutworm centers per plot were counted.

Example 3

The study was conducted on perennial ryegrass maintained under fairway management conditions, and mowed three times per week at 0.5-in. cutting height. The experimental turf area was fertilized with 1.5 lb nitrogen (18-9-18) and per 1000 sq ft on 15 May and 20 July Treatment plots, 3 ft×6 ft, were arranged in a randomized complete block design with three replications. All treatments were applied with a $CO_2$-powered sprayer using a TeeJet 11008E nozzle at 40 psi, in water equivalent to 2 gal per 1000 sq ft. Treatments applications were made on 2, 16, 30 August, and 6 September. The experimental turf area was inoculated with M. oryzae on 16 August and 2 September ($4.5 \times 10^4$ and $5.2 \times 10^4$ conidia per ml aqueous suspension, respectively). The turf was maintained at a 2.5-inch cutting height following the inoculation, and mowed once a week. Disease incidence was assessed on 9 and 16 September Data were subjected to analysis of variance and multiple comparisons of the mean values were made using the Waller-Duncan k-ratio test.

Civitas 2 Pack, Civitas 1 Pack and 1 Pack tank mix with Thiophanate-methyl fungicide (Cleary 3336) significantly controlled the disease when compared to untreated control.

| | | Application | Disease incidence[z] | |
|---|---|---|---|---|
| Trt No.[y] | Treatment[x] | Rate/1000 ft2 | 9-Sep | 16-Sep |
| 1 | Civitas 1Pack | 17 fl oz | 15.3 e-i | 23 de |
| 2 | Civitas Harmonizer | 16 fl oz 1 fl oz | 18 d-g | 20.7 d-g |
| 3 | Civitas 1 Pack Cleary 3336 | 17 fl oz 2 oz | 11.7 h-k | 14.3 h-k |
| 4 | Untreated control | | 47.3 a | 61.7 a |

[z]Gray Leaf Spot Incidence (% leaf blades symptomatic). Means of three replications of treatments.
Perennial ryegrass turf plots (0.5-inch) were inoculated with Magnaporthe otyzae on 16 and 2 Sep. ($4.5 \times 10^4$ and $5.2 \times 10^4$ conidia per ml aqueous suspension, respectively).
[y]Tank-mixes shown as a single treatment number.
[x]14-day application made on 2, 16, 30 Aug, and 6 Sep.
[w]Means followed by same letter do not significantly differ (P = 0.05, Waller-Duncan k = 100).

Other embodiments are within the scope of the following claims.

What is claimed is:

1. A pesticide concentrate composition consisting of:
    85 wt % to 95 wt % of a paraffinic oil continuous phase;
    1 wt % to 2.5 wt % of an emulsifier;
    an aqueous phase dispersed as droplets into the paraffinic oil continuous phase, the aqueous phase consisting of a water dispersible pigment dispersed within the aqueous phase, wherein the pesticide concentrate composition contains 2 wt % to 3 wt % of the water dispersible pigment;
    1 wt % to 2 wt % of a silicone surfactant and polyethylene glycol;
    1 wt % to 2.5 wt % of an anti-settling agent which is dispersed into the paraffinic oil continuous phase;
    optionally, one or more chemical fungicides; and
    water;
    wherein the pigment is a phthalocyanine;
    wherein the anti-settling agent is untreated fumed silica;
    wherein the pesticide concentrate composition is a water-in-oil emulsion that is stabilized by the anti-settling agent;
    wherein the water present in the pesticide concentrate composition is the water from the aqueous phase droplets; and
    wherein the emulsifier is selected from the group consisting of a natural or synthetic alcohol ethoxylate, an alcohol alkoxylate, a glycerol oleate, a polyoxyethylene-polyoxypropylene block copolymer, an alkyl phenol ethoxylate, a polyethylene glycol, a sorbitan fatty acid ester ethoxylate, and a combination thereof.

2. The pesticide concentrate composition according to claim 1, wherein the paraffinic oil continuous phase contains a paraffin having from 16 carbon atoms to 35 carbon atoms.

3. The pesticide concentrate composition according to claim 1, wherein the paraffinic oil continuous phase contains synthetic isoparaffins.

4. The pesticide concentrate composition according to claim 1, wherein the pigment is a polychlorinated Cu(II) phthalocyanine.

5. The pesticide concentrate composition according to claim 1, wherein the silicone surfactant is a silicone polyether.

6. The pesticide concentrate composition according to claim 1, wherein the polyethylene glycol contains a compound according to formula IV:

$$R^1-O-(CH_2CH_2O)_f-R^2$$

wherein $R^1$=H or $CH_2$=CH—$CH_2$ or $COCH_3$; $R^2$=H or $CH_2$=CH—$CH_2$ or $COCH_3$; f≥1.

7. The pesticide concentrate composition according to claim 1, wherein the water dispersible pigment has a particle size of not more than 100 micrometers.

8. The pesticide concentrate composition according to claim 1, wherein the pesticide concentrate composition includes the one or more chemical fungicides.

9. The pesticide concentrate composition according to claim 1, wherein the anti-settling agent is present in an amount sufficient to prevent at least 50 percent of the water dispersible pigment from coalescing and/or settling out of the aqueous phase and forming a non-dispersible solid mass of the water dispersible pigment.

10. The pesticide concentrate composition according to claim 1, wherein the anti-settling agent is present in an amount sufficient to prevent at least 99 percent of the water dispersible pigment from coalescing and/or settling out of the aqueous phase and forming a non-dispersible solid mass of the water dispersible pigment.

11. A method of treating a turfgrass, the method comprising: diluting the pesticide concentrate composition as defined in claim 1 with water, to form a diluted pesticide composition; and applying to the turfgrass the diluted pesticide composition.

12. The method according to claim 11, wherein the pigment is a polychlorinated Cu(II) phthalocyanine.

13. The method according to claim 11, wherein the pesticide concentrate composition, or the diluted pesticide composition includes the one or more chemical fungicides.

14. The method according to claim 11, further comprising agitating the pesticide concentrate composition prior to the diluting of the pesticide concentrate composition, to re-disperse any water dispersible pigment that has aggregated.

15. The method according to claim 11, wherein the weight percent of the paraffinic oil continuous phase in the diluted pesticide composition is from 2 to 5 weight percent.

16. The method according to claim 11, and further comprising applying shear stress to the pesticide concentrate composition to form a shelf-stable pigment emulsion prior to diluting of the pesticide concentrate composition.

17. The method according to claim 16 wherein applying shear stress includes reducing the particle size of the water dispersible pigment.

18. The method according to claim 11, wherein the applying to turfgrass is by spraying.

* * * * *